United States Patent
Lee et al.

(10) Patent No.: US 10,498,551 B2
(45) Date of Patent: Dec. 3, 2019

(54) DATA MULTICAST OR BROADCAST ON CONTROL CHANNEL FOR NARROWBAND COMMUNICATION

(71) Applicant: QUALCOMM Incorporated, San Diego, CA (US)

(72) Inventors: Kuo-Chun Lee, San Diego, CA (US); Sivaramakrishna Veerepalli, San Diego, CA (US); Liangchi Hsu, San Diego, CA (US); Chun-Hao Hsu, San Jose, CA (US); Suli Zhao, San Diego, CA (US); Ralph Akram Gholmieh, San Diego, CA (US); Nagaraju Naik, San Diego, CA (US); Carlos Pazos, Carlsbad, CA (US); Masato Kitazoe, Hachiouji (JP); Mungal Singh Dhanda, Slough (GB); Hao Xu, Beijing (CN); Feilu Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/696,000

(22) Filed: Sep. 5, 2017

(65) Prior Publication Data
US 2018/0145839 A1 May 24, 2018

Related U.S. Application Data

(60) Provisional application No. 62/425,014, filed on Nov. 21, 2016.

(51) Int. Cl.
*H04L 12/18* (2006.01)
*H04W 72/14* (2009.01)
(Continued)

(52) U.S. Cl.
CPC ............. *H04L 12/189* (2013.01); *H04W 4/06* (2013.01); *H04W 72/14* (2013.01); *H04W 76/40* (2018.02);
(Continued)

(58) Field of Classification Search
CPC ...................................................... H04L 12/189
See application file for complete search history.

(56) References Cited

U.S. PATENT DOCUMENTS

| | | |
|---|---|---|
| 2011/0013515 A1 | 1/2011 | Lecompte |
| 2014/0198707 A1 | 7/2014 | Wang et al. |

(Continued)

FOREIGN PATENT DOCUMENTS

| | | |
|---|---|---|
| EP | 3244687 A1 | 11/2017 |
| WO | WO-2016111580 A1 | 7/2016 |

(Continued)

OTHER PUBLICATIONS

LTE; "Evolved Universal Terrestrial Radio Access (E-UTRA) and Evolved Universal Terrestrial Radio Access Network (E-UTRAN); Overall description; Stage 2 (3GPP TS 36.300 version 13.2.0 Release 13)", 3GPP TS 36.300 version 13.2.0 Release 13, ETSI TS 136 300 V13.2.0 (Jan. 2016), pp. 1-299.

(Continued)

*Primary Examiner* — Shripal K Khajuria
(74) *Attorney, Agent, or Firm* — Holland & Hart LLP

(57) ABSTRACT

Methods, systems, and devices for wireless communication are described. Data for a broadcast or multicast service may be sent over a control channel. A network device may broadcast a message to indicate a plurality of enhanced multimedia broadcast multicast service (eMBMS) services offered by the network. The mobile device may transmit an indication to the network device identifying an eMBMS service of interest. The network device may transmit a (Continued)

configuration message before broadcasting or multicasting data of the eMBMS service of interest. The configuration message may notify the mobile device of a control channel on which to receive the data related to the eMBMS service. The network device may then broadcast or multicast the eMBMS service data on the control channel. The data may be segmented at a particular protocol layer and mapped to several transmission time intervals within each repetition of the control channel.

30 Claims, 20 Drawing Sheets

(51) Int. Cl.
*H04W 4/06* (2009.01)
*H04W 76/40* (2018.01)
*H04W 4/08* (2009.01)
*H04W 68/02* (2009.01)
*H04W 72/00* (2009.01)

(52) U.S. Cl.
CPC .............. *H04W 4/08* (2013.01); *H04W 68/02* (2013.01); *H04W 72/005* (2013.01)

(56) References Cited

U.S. PATENT DOCUMENTS

| | | |
|---|---|---|
| 2016/0087904 A1 | 3/2016 | Chun et al. |
| 2016/0227383 A1 | 8/2016 | Lin |
| 2017/0201964 A1* | 7/2017 | Gupta .................. H04L 12/189 |
| 2017/0325076 A1 | 11/2017 | Fujishiro et al. |
| 2018/0279405 A1* | 9/2018 | Kim ...................... H04W 24/10 |

FOREIGN PATENT DOCUMENTS

| | | |
|---|---|---|
| WO | WO-2016121787 A1 | 8/2016 |
| WO | WO-2016163837 A1 | 10/2016 |

OTHER PUBLICATIONS

International Search Report and Written Opinion—PCT/US2017/062374—ISA/EPO—Feb. 21, 2018.

\* cited by examiner

US 10,498,551 B2

DATA MULTICAST OR BROADCAST ON CONTROL CHANNEL FOR NARROWBAND COMMUNICATION

CROSS REFERENCES

The present Application for Patent claims priority to U.S. Provisional Patent Application No. 62/425,014 by LEE et al., entitled "Data Multicast or Broadcast on Control Channel For Narrowband Communication," filed Nov. 21, 2016, assigned to the assignee hereof.

BACKGROUND

The following relates generally to wireless communication and more specifically to data multicast or broadcast on a control channel to support narrowband communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communication systems, a single-cell point-to-multipoint (SCPTM) service is used to support Multimedia Broadcast Multicast Service (MBMS) services over a single cell. SCPTM services may provide flexibility in scheduling to accommodate user interest. However, traditional techniques for providing MBMS content to multiple UEs may be inefficient in SCPTM contexts and may introduce and require complex configurations by the UEs attempting to subscribe to certain SCPTM services.

SUMMARY

Broadcast or multicast data may be transmitted on a control channel using single-cell point-to-multipoint (SCPTM) techniques. This may allow for flexible scheduling and utilization of resources while limiting the complexity of operations and hardware necessary to receive the data. This, in turn, may allow for efficient narrowband communications, such as narrowband-internet of things (NB-IOT) or enhanced machine type communication (eMTC), within a network.

As described herein, in some wireless communication systems, network devices may multicast or broadcast data to one or more UEs. In some cases, this data may include eMBMS data. Network devices may transmit one or more control messages before multicasting or broadcasting the eMBMS data. A network device may transmit a system information block (SIB) to a UE, where the SIB may enable the UE to receive eMBMS data. A network device may transmit a single cell multipoint control channel (SC-MCCH) notification message that indicates a new temporary mobile group identity (TMGI) added to a SC-MCCH logical channel. In some cases, after transmitting the SC-MCCH notification message, a network device may transmit a SC-MCCH single cell point to multipoint (SCPTM) configuration message, and the SC-MCCH SCPTM configuration message may activate or initiate activation of an MBMS bearer (MRB). In some examples, the MRB may receive SC-MCTH associated with a TMGI via a physical downlink control channel (PDSCH).

A method of wireless communication is described. The method may include transmitting a system information block (SIB) indicating a configuration to receive a single-cell multicast control channel (SC-MCCH) for single cell point to multipoint (SCPTM) communication, identifying broadcast or multicast data associated with a group of devices which receive at least one evolved multimedia broadcast multicast service (eMBMS) service on a single cell multicast traffic channel (SC-MTCH) of the SCPTM communication, and transmitting the data on the SC-MCCH within a time period determined by the configuration.

An apparatus for wireless communication is described. The apparatus may include means for transmitting a system information block (SIB) indicating a configuration to receive a single-cell multicast control channel (SC-MCCH) for single cell point to multipoint (SCPTM) communication, means for identifying broadcast or multicast data associated with a group of devices which receive at least one evolved multimedia broadcast multicast service (eMBMS) service on a single cell multicast traffic channel (SC-MTCH) of the SCPTM communication, and means for transmitting the data on the SC-MCCH within a time period determined by the configuration.

Another apparatus for wireless communication is described. The apparatus may include a processor, memory in electronic communication with the processor, and instructions stored in the memory. The instructions may be operable to cause the processor to cause the apparatus to transmit a system information block (SIB) indicating a configuration to receive a single-cell multicast control channel (SC-MCCH) for single cell point to multipoint (SCPTM) communication, identify broadcast or multicast data associated with a group of devices which receive at least one evolved multimedia broadcast multicast service (eMBMS) service on a single cell multicast traffic channel (SC-MTCH) of the SCPTM communication, and transmit the data on the SC-MCCH within a time period determined by the configuration.

A non-transitory computer readable medium for wireless communication is described. The non-transitory computer-readable medium may include instructions operable to cause a processor to transmit a system information block (SIB) indicating a configuration to receive a single-cell multicast control channel (SC-MCCH) for single cell point to multipoint (SCPTM) communication, identify broadcast or multicast data associated with a group of devices which receive at least one evolved multimedia broadcast multicast service (eMBMS) service on a single cell multicast traffic channel (SC-MTCH) of the SCPTM communication, and transmit the data on the SC-MCCH within a time period determined by the configuration.

In some examples of the method, apparatus, and non-transitory computer-readable medium described above, the data is transmitted in a first message and an SCPTM configuration is transmitted in a second message different from the first message on the SC-MCCH. In some examples of the method, apparatus, and non-transitory computer-readable medium described above, data is multiplexed with SCPTM configuration data on the SC-MCCH Some examples of the method, apparatus, and non-transitory computer-readable medium described above may further include processes, features, means, or instructions for transmitting a plurality of grants for the SC-MCCH on a downlink control channel, wherein transmitting the data on the SC-MCCH comprises transmitting a plurality of MAC packets within the time period. In some examples of the method, apparatus, and non-transitory computer-readable medium described above, multiplexing the data is performed at a radio link control (RLC) layer of a wireless communication protocol.

In some examples of the method, apparatus, and non-transitory computer-readable medium described above, the data further comprises an identifier associated with the group of devices. In some examples of the method, apparatus, and non-transitory computer-readable medium described above, the identifier comprises at least one of a temporary mobile group identity (TMGI), or a service ID, or a group ID, or a destination internet protocol (IP) address and UDP port, or a combination thereof.

In some examples of the method, apparatus, and non-transitory computer-readable medium described above, the group of devices comprises at least one of a CAT-M1 or a CAT-NB1 device. In some examples of the method, apparatus, and non-transitory computer-readable medium described above, transmitting the data on the SC-MCCH is performed independent of a change notification.

Some examples of the method, apparatus, and non-transitory computer-readable medium described above may further include processes, features, means, or instructions for determining that a size of the data is less than a threshold size. In some examples of the method, apparatus, and non-transitory computer-readable medium described above, transmitting the data on the SC-MCCH within the time period is based at least in part on determining the size of the data.

Some examples of the method, apparatus, and non-transitory computer-readable medium described above may further include processes, features, means, or instructions for receiving an indication of a user equipment (UE) capability of at least one of the group of devices for the at least one eMBMS service, and configuring the at least one eMBMS service based at least in part on the indication.

Some examples of the method, apparatus, and non-transitory computer-readable medium described above for transmitting the data may further include processes, features, means, or instructions for multiplexing the data with SC-MCCH control information at a radio link control (RLC) protocol entity.

Some examples of the method, apparatus, and non-transitory computer-readable medium described above for identifying broadcast or multicast data may further include processes, features, means, or instructions for identifying the data during a first SC-MCCH modification period.

Some examples of the method, apparatus, and non-transitory computer-readable medium described above for transmitting the data may further include processes, features, means, or instructions for transmitting the data during the first SC-MCCH modification period. Some examples of the method, apparatus, and non-transitory computer-readable medium described above for transmitting the data may further include processes, features, means, or instructions for transmitting the data during a second SC-MCCH modification period after the first SC-MCCH modification period. Some examples of the method, apparatus, and non-transitory computer-readable medium described above for transmitting the data may further include processes, features, means, or instructions for transmitting the data during a plurality of SC-MCCH modification periods that each comprise a plurality of repetitions of the SC-MCCH.

Some examples of the method, apparatus, and non-transitory computer-readable medium described above may further include processes, features, means, or instructions for receiving signaling comprising the data from an eMBMS gateway via a mobility management entity (MME), wherein the data is identified based at least in part on the signaling. In some examples of the method, apparatus, and non-transitory computer-readable medium described above, the signaling comprises non-access stratum (NAS) signaling, and the transmission on the SC-MCCH comprises a NAS transport message.

Some examples of the method, apparatus, and non-transitory computer-readable medium described above may further include processes, features, means, or instructions for transmitting a message that indicates timing associated with the at least one eMBMS service. In some examples of the method, apparatus, and non-transitory computer-readable medium described above, the message that indicates the timing comprises user service description (USD). In some examples of the method, apparatus, and non-transitory computer-readable medium described above, the message that indicates the timing comprises direction indication information (DII). In some examples of the method, apparatus, and non-transitory computer-readable medium described above, the DII is transmitted during a paging occasion (PO) that is associated with the at least one eMBMS service.

Some examples of the method, apparatus, and non-transitory computer-readable medium described above may further include processes, features, means, or instructions for segmenting the data into one or more radio link control (RLC) protocol data units (PDUs) that each comprise an RLC header, generating one or more medium access control (MAC) PDUs that each comprise one of the RLC PDUs, and transmitting the one or more MAC PDUs during a plurality of subframes within a repetition period of the SC-MCCH.

In some examples of the method, apparatus, and non-transitory computer-readable medium described above, one of the RLC PDUs comprises SCPTM configuration data and a first portion of the data and another of the RLC PDUs comprises a second portion of the data. In some examples of the method, apparatus, and non-transitory computer-readable medium described above, the RLC header comprises at least one of framing information, a length of a segment, or a sequence number, or any combination thereof.

Another method of wireless communication is described. The method may include receiving a system information block (SIB) indicating a configuration to receive a single-cell multicast control channel (SC-MCCH) for single cell point to multipoint (SCPTM) communication, and receiving broadcast or multicast data on the SC-MCCH within a time period determined by the configuration.

An apparatus for wireless communication is described. The apparatus may include means for receiving a system information block (SIB) indicating a configuration to receive a single-cell multicast control channel (SC-MCCH) for single cell point to multipoint (SCPTM) communication, and means for receiving broadcast or multicast data on the SC-MCCH within a time period determined by the configuration.

Another apparatus for wireless communication is described. The apparatus may include a processor, memory in electronic communication with the processor, and instructions stored in the memory. The instructions may be operable to cause the processor to cause the apparatus to receive a system information block (SIB) indicating a configuration to receive a single-cell multicast control channel (SC-MCCH) for single cell point to multipoint (SCPTM) communication, and receive broadcast or multicast data on the SC-MCCH within a time period determined by the configuration.

A non-transitory computer readable medium for wireless communication is described. The non-transitory computer-readable medium may include instructions operable to cause a processor to receive a system information block (SIB) indicating a configuration to receive a single-cell multicast control channel (SC-MCCH) for single cell point to multipoint (SCPTM) communication, and receive broadcast or multicast data on the SC-MCCH within a time period determined by the configuration.

In some examples of the method, apparatus, and non-transitory computer-readable medium described above, the broadcast or multicast data is received in a first message and an SCPTM configuration is received in a second message different from the first message.

Some examples of the method, apparatus, and non-transitory computer-readable medium described above may further include processes, features, means, or instructions for transmitting an indication of capability for an evolved multimedia broadcast multicast service (eMBMS) service on a single cell multicast traffic channel (SC-MTCH) of the SCPTM communication.

Some examples of the method, apparatus, and non-transitory computer-readable medium described above may further include processes, features, means, or instructions for determining an indication for receiving the broadcast or multicast data based at least in part on a temporary mobile group identity (TMGI) or a group ID.

In some examples of the method, apparatus, and non-transitory computer-readable medium described above, the eMBMS service comprises a user service description (USD). Some examples of the method, apparatus, and non-transitory computer-readable medium described above may further include processes, features, means, or instructions for receiving the broadcast or multicast data during a first SC-MCCH modification period based at least in part on the USD. In some examples of the method, apparatus, and non-transitory computer-readable medium described above, the eMBMS service comprises direction indication information (DII).

Some examples of the method, apparatus, and non-transitory computer-readable medium described above may further include processes, features, means, or instructions for monitoring a paging occasion (PO) associated with a temporary mobile group identity (TMGI) or a group ID, and receiving the DII or the eMBMS service during the PO.

Some examples of the method, apparatus, and non-transitory computer-readable medium described above may further include processes, features, means, or instructions for receiving a message that indicates timing associated with the eMBMS service.

DETAILED DESCRIPTION

Figure 1:
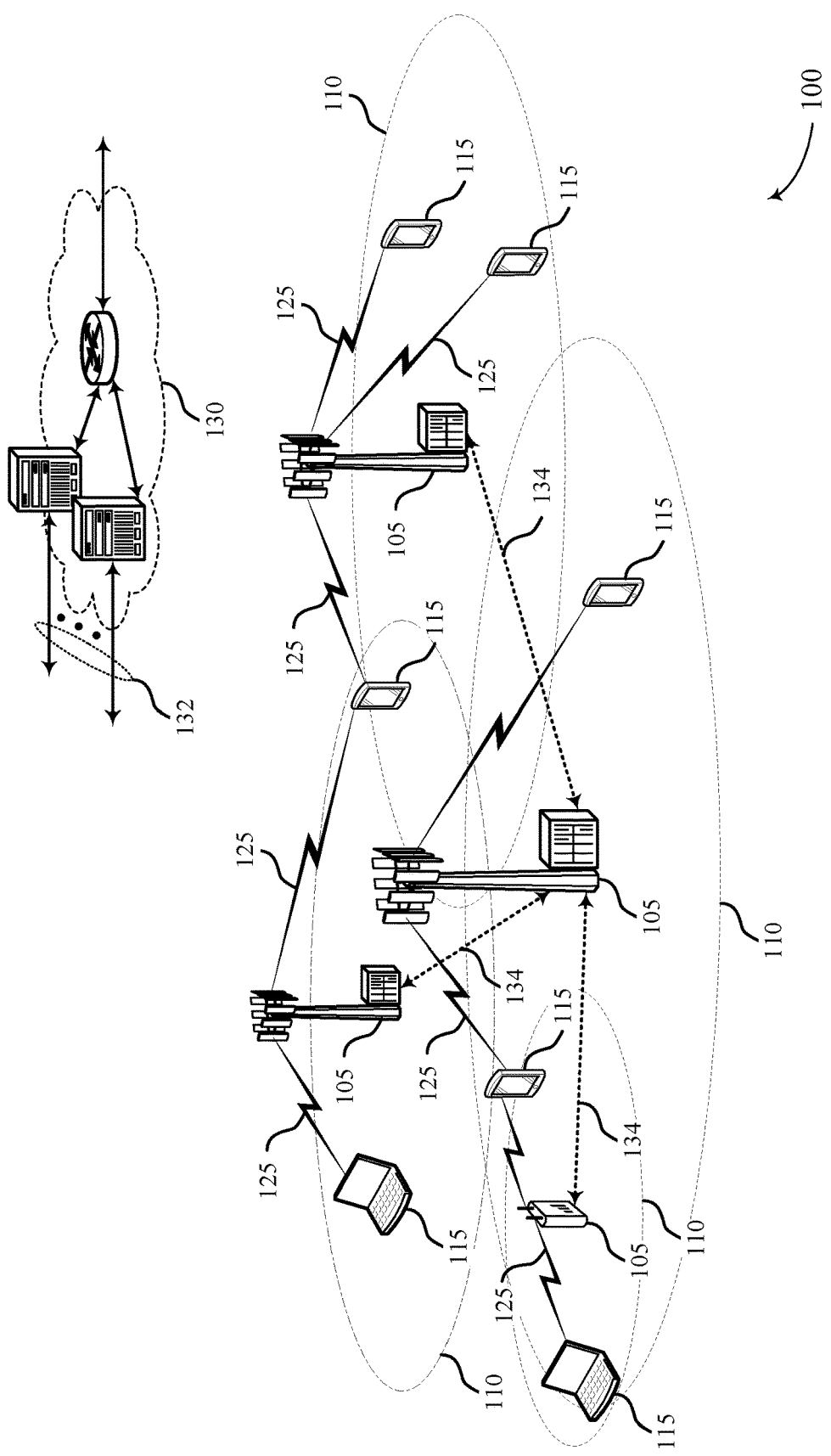
FIG. 1 illustrates an example of a wireless communication system that supports multicasting or broadcasting data in accordance with aspects of the present disclosure.

Broadcast or multicast data may be transmitted on a control channel using, for example, single-cell point-to-multipoint (SCPTM) or enhanced multimedia broadcast multicast service (eMBMS) techniques. This may allow a network to flexibly schedule resources and provide broadcast or multicast services, and it may allow user equipment (UEs) (e.g., Internet of Things (IoT) devices or machine type communication (MTC) devices) to receive services of interest without undue complexity or overhead.

By way of example, a base station may broadcast a system information block (SIB) that indicates a configuration for receiving eMBMS services that are available. The base station may identify broadcast or multicast data associated with one of the services—e.g., based on an indication from a UE that the UE is interest in subscribing to the service—and the base station may transmit the data on multicast control channel. The data may be transmitted with an SCPTM configuration message. In some cases, the data sent on the control channel is relatively small, as compared with a quantity of data that may typically be sent using SCPTM techniques, so leveraging the multicast control channel may allow the UE to avoid the complexity of some SCPTM operations.

In some cases, to receive SCPTM services, a UE may need to undertake a relatively complex series of steps in preparation. For instance, the UE may receive a single cell multipoint control channel (SC-MCCH) notification message, which may indicate to a UE a new temporary mobile group identity (TMGI) added to a SC-MCCH logical channel for a service of interest. Then the UE may then receive an (SCPTM) configuration message, which may cause the UE to activate an MBMS bearer (MRB). The MRB, in turn, may allow the UE may to receive an SC-MCTH associated with the TMGI of the SCPTM service of interest. The UE may then receive and decode a physical shared channel (PDSCH) to receive the SCPTM service.

Multicasting or broadcasting data on the SC-MCTH may be an inefficient and require complex means for UEs to receive the data, particularly if the size of a data transmission is relatively small, as may be the case for narrowband communications like IoT and eMTC. The techniques described herein may thus improve multicasting or broadcasting processes by configuring the SC-MCCH logical channel to carry broadcast or multicast segments of data to one or more requesting UEs. This may limit the need or frequency with which a UE may undertake a more complex procedure to receive data via the SC-MCTH.

Aspects of the disclosure introduced above are described below in the context of a wireless communications system. Various examples of signaling exchanges, packet data unit segmentation, transmission timing, and the like are then described. Aspects of the disclosure are further illustrated by and described with reference to apparatus diagrams, system diagrams, process flows, and flowcharts that relate to data multicast or broadcast on a control channel for narrowband communications.

FIG. 1 illustrates an example of a wireless communications system 100 that supports multicasting or broadcasting data in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide eMBMS service data, user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more of network devices, such as a base station 105, may include a small size data multicast manager (e.g., base station small size data multicast manager 815), which may transmit a system information block (SIB) indicating a configuration to receive a plurality of eMBMS services available for subscription on a multicast control channel; or identify broadcast or multicast data associated with at least one eMBMS service of the plurality; or transmit the data and a single cell point to multipoint (SCPTM) configuration for the at least one eMBMS service on the multicast control channel; or a combination thereof. In some cases, one or more of network devices, such as a base station 105, may include a small size data multicast manager (e.g., base station small size data multicast manager 815), which may transmit a system information block (SIB) indicating a configuration to receive a single-cell multicast control channel (SC-MCCH) for single cell point to multipoint (SCPTM) communication, identify broadcast or multicast data associated with a group of devices which receive at least one evolved multimedia broadcast multicast service (eMBMS) service on a single cell multicast traffic channel (SC-MTCH) of the SCPTM communication, and transmit the data on the SC-MCCH within a time period determined by the configuration.

In some examples, data is transmitted in a first message and an SCPTM configuration is transmitted in a second message different from the first message on the SC-MCCH. Within wireless communications system 100, eMBMS or SCPTM services may be associated with or identified by a temporary mobile group identity (TMGI). For example, a server with core network 130 may provide a TMGI to identify an eMBMS or SCPTM session within wireless communications system 100. A TMGI may be a combination of a network or system identity, such as a public land mobile network (PLMN) and a service identity.

UEs 115 may include a UE small size data multicast manager (e.g., UE small size data multicast manager 1215), which may receive a system information block (SIB) indicating a configuration to receive a single-cell multicast control channel (SC-MCCH) for single cell point to multipoint (SCPTM) communication, and receive broadcast or multicast data on the SC-MCCH control channel within a time period determined by the configuration.

Alternatively, a UE small size data multicast manager (e.g., UE small size data multicast manager 1215), may receive a system information block (SIB) indicating a configuration to receive a plurality of evolved multimedia broadcast multicast service (eMBMS) services available for subscription on a multicast control channel; or receive broadcast or multicast data and a single cell point to multipoint (SCPTM) configuration for at least one eMBMS of the plurality of eMBMS services on the multicast control channel; or a combination thereof.

Wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, such as a base station 105 (or component of a base station 105), or core network 130 supporting radio bearers for user plane data. At the Physical (PHY) layer, transport channels may be mapped to physical channels.

Wireless communications system 100 may include a Radio Link Control (RLC) layer that connects higher layers (e.g., radio resource control (RRC) and PDCP) to the lower layers (e.g., the MAC layer). The RLC layer may be located between the PDCP layer and the MAC layer in the Long Term Evolution (LTE) user plane protocol stack. The RLC layer may perform segmentation and reassembly of upper layer packets in order to adapt them to the size which can actually be transmitted over the radio interface. For radio bearers which benefit from error-free transmission, the RLC layer also performs retransmission to recover from packet losses. Additionally, the RLC layer may perform reordering to compensate for out-of-order reception due to Hybrid Automatic Repeat reQuest (hybrid automatic repeat request (HARQ)) operation in the MAC layer. There may be one RLC entity defined per radio bearer.

At the transmitting side within wireless communications system 100, a protocol data unit (PDU) of a layer may be defined as the output of that layer to the layer below. For example, each layer receives a Service Data Unit (SDU) from the layer above. At the receiving side, a layer receives its PDUs from the layer below.

An RLC entity in a base station 105 or a UE 115 may ensure that transmission packets are organized into appropriately sized blocks (corresponding to the MAC layer transport block size). If an incoming data packet (i.e., a PDCP or RRC SDU) is too big for transmission, the RLC layer may segment it into several smaller RLC PDUs. If the incoming packets are too small, the RLC layer may concatenate several of them into a single, larger RLC PDU. Each RLC PDU may include a header including information about how to reassemble the data. The RLC layer may also ensure that packets are reliably transmitted.

Within wireless communications system 100, System Information (SI) may be broadcasted in system information blocks (SIBs), each of which may contain a set of functionally-related parameters. Different SIBs may be defined according to the type of system information conveyed. For instance, SIB1 may include access information, such as cell identity information, and may also indicate whether a UE 115 is allowed to camp on a cell. SIB1 also includes cell selection information (or cell selection parameters). Additionally, SIB1 may include scheduling information for other SIBs. SIB2 may include access information and parameters related to common and shared channels. SIB13 may include information related to MBMS configuration. SIB20 may include information that indicates a configuration of a multicast control channel, or it may otherwise indicate to a UE 115 how to receive control information related to SCPTM transmissions. Other SIBs may also be defined that may relate to eMBMS or SCPTM services.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Small amounts of data may be transmitted using relatively few resource blocks.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some examples of wireless communications system 100, UEs 115 receive eMBMS data via one or more transmissions (e.g., broadcasts, multicasts). For example, UE 115 may receive one or more control messages and then receive the eMBMS data. UE 115 may receive a SIB that enables the UE 115 to receive eMBMS data. UE 115 may, in some examples, also receive a SC-MCCH notification message indicating a TMGI added to a SC-MCCH logical channel. In some cases, UE 115 may receive a SC-MCCH SCPTM configuration message.

Figure 2:
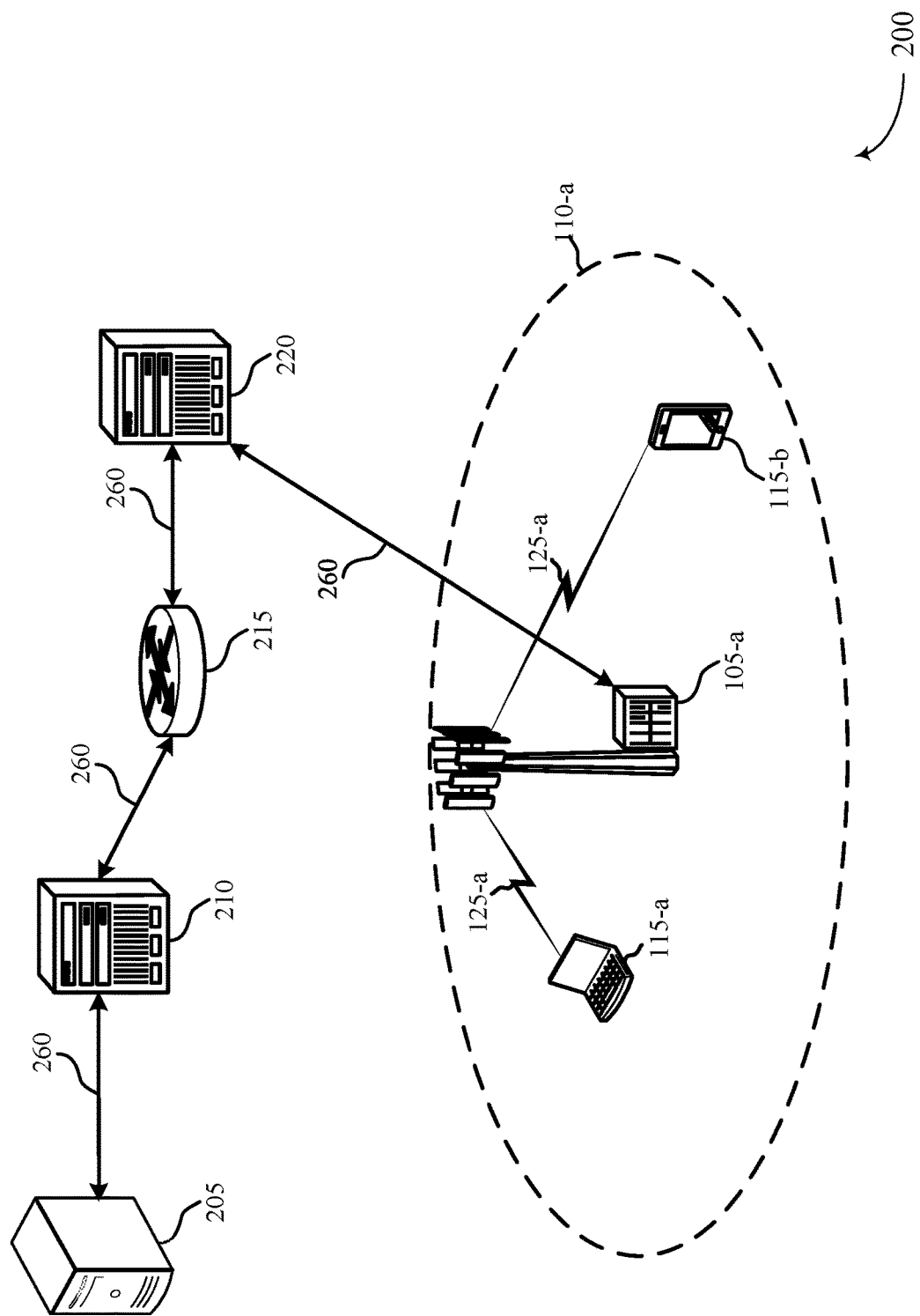
FIG. 2 illustrates an example of a wireless communication system that supports multicasting or broadcasting data in accordance with aspects of the present disclosure.

FIG. 2 illustrates an example of a wireless communications system 200 that supports multicasting or broadcasting data in accordance with aspects of the present disclosure. Wireless communications system 200 may include base station 105-a, UE 115-a, and UE 115-b, which may be examples of the corresponding devices described with reference to FIG. 1. UE 115-a and UE 115-b may receive data from the base station 105-a via communication links 125-a.

Additionally or alternatively, wireless communications system 200 may include an application server 205, a broadcast multicast service center (BMSC) 210, a multimedia broadcast multicast service gateway (MBMS-GW), a mobile management entity (MME), or a combination thereof. In some examples, wireless communications system 200 may support broadcasting or multicasting data. For example, wireless communications system 200 may support transmitting eMBMS service data in one or more messages on a multicast control channel.

In some examples of wireless communications system 200, base station 105-a may multicast or broadcast data to a set of UE 115. The data may include eMBMS data. For example, base station 105-a may transmit one or more control messages before multicasting or broadcasting the eMBMS data. For examples, base station 105-a may broadcast a SIB, which may be received by UE 115-a, UE 115-b, or both. The SIB may enable UE 115-a or UE 115-b to receive the eMBMS data. Base station 105-a may transmit a single cell multipoint control channel (SC-MCCH) notification message. A SC-MCCH notification message may indicate to UE 115-a or UE 115-b a new TMGI added to the SC-MCCH logical channel. In some cases, after transmitting the SC-MCCH change notification message, base station 105-a may transmit an SC-MCCH SCPTM configuration message. The SC-MCCH SCPTM configuration message may activate an MBMS bearer (MRB). In some examples, the MRB may receive SC-MCTH associated with a TMGI via a physical downlink control channel (PDSCH).

Multicasting or broadcasting data on the SC-MCTH can be an inefficient and complex means for UEs 115 (e.g., UE 115-a and UE 115-b) to receive the multicast or broadcast data from base station 105-a. As a result, wireless communications system 200 may improve multicasting or broadcasting processes by configuring the SC-MCCH logical channel to broadcast or multicast segments of data to one or more UEs 115 (e.g., requesting UEs). Base station 105-a may thus multicast or broadcast data (eMBMS data) to UEs 115 without the additional complexity introduced when multicasting or broadcasting data via a SC-MCTH logical channel.

In some examples, UE 115-a or UE 115-b may be Internet of Things (IoT) devices. Wireless communications system 200 may include one or more categories of IoT devices. One category of an IoT device may include CAT-M1. CAT-M1 IoT devices may, for example, transmit or receive data between a range of 300 kbps and 1000 kbps via 1.4 MHz bandwidth in the radio frequency spectrum band. Alternatively, another category of an IoT device may include CAT-NB1. In some examples, UE 115-a may be a CAT-M1 IoT device and UE 115-b may be a CAT-NB1 IoT device. Or UE 115-a may be a CAT-NB1 IoT device and UE 115-b may be a CAT-M1 IoT device. UE 115-a or UE 115-b may transmit data using a subset of bandwidth in a radio frequency spectrum band based on the (IoT device) category of the UE, i.e., UE 115-a or UE 115-b.

For example, if either on UE 115-a or UE 115-b is a CAT-M1 IoT device, it may transmit or receive data via a 1 MHz bandwidth of a radio frequency spectrum band. In contrast, if either UE 115-a or UE 115-b is a CAT-NB1 IoT device, it may transmit or receive data via a different bandwidth (e.g., kHz bandwidth). For instance, A CAT-NB1 IoT device may utilize a 180 kHz bandwidth compared to a 1 MHz bandwidth associated with a CAT-M1 IoT device. In some examples, UE 115-a and UE 115-b may transmit data via physical resource blocks (PRBs). UE 115-a and UE 115-b may transmit or receive data via PRBs based on their corresponding bandwidth. That is, if either UE 115-*a* or UE 115-*b* is a CAT-M1 IoT device, it may transmit data using six PRBs. Alternatively, if UE 115-*a* or UE 115-*b* is a CAT-NB1 IoT device, it may transmit data using one PRB. In some examples, base station 105-*a* may transmit data, e.g., broadcast or multicast data, to UE 115-*a* and UE 115-*b* based on a request from UE 115-*a* and UE 115-*b*. In some cases, bases station 105-*a* may receive the data from an application server 205.

Application server 205 may receive and respond to requests for data associated with eMBMS services available for subscription. For example, UE 115-*a* and/or UE 115-*b* may transmit a request to base station 105-*a* for data. Base station 105-*a* may receive and forward the request to the application server 205 via one or more communication links 260. In some cases, after receiving the request, application server 205 may transmit the requested data to broadcast multicast service center (BMSC) 210 via communication links 260. BMSC 210 may be, in some examples, part of core network 130 and may provide a TMGI as described above.

BMSC 210 may include a point to multipoint interface that may provide support transmitting requested data in a message on a multicast control channel to UE 115-*a*, UE 115-*b*, or both. In some examples, BMSC 210 may provide support for transmitting data in a message on a multicast control channel concurrently to both UE 115-*a* and UE 115-*b*. In some examples, BMSC 210 may transmit the requested data to multimedia broadcast multicast service gateway (MBMS-GW) 215 via communication links 260. MBMS-GW 215 may include one or more logical channels for transmitting data. e.g., eMBMS data. Additionally, MBMS-GW 215 may transmit the requested data to mobile management entity (MME) 220 via communication links 260.

MME 220 may perform MBMS session control signaling. For example, session control signaling may include a session start time, or a session end time, or a session update time, or a combination thereof. Additionally, MME 220 may provide session control signaling to base station 105-*a*. In some cases, MME 220 may provide the requested data to base station 105-*a* for multicasting the requested data to UE 115-*a* or UE 115-*b*, or broadcasting the requested data to UE 115-*a* and UE 115-*b* concurrently based on the session control signaling.

In some cases, base station 105-*a* may broadcast system information in SIBs based on receiving the requested data from MME 220. As mentioned above, a SIB may provide information associated with receiving the request data. For example, SIB20 may provide information to a device (e.g., UE 115-*a* and/or UE 115-*b*) for receiving requested data on a multicast control channel.

In some examples, UE 115-*a* or UE 115-*b* may receive an indication that base station 105-*a* supports broadcasting or multicasting data on a control channel. For example, an indication may include information that base station 105-*a* may transmit data to UE 115-*a* or UE 115-*b* using a control plane (CP) instead via a user plane (UP). Additionally or alternatively, UE 115-*a* or UE 115-*b* may be notified of an upcoming data transmission (e.g., multicast or broadcast data) from base station 105-*a* via a control channel. As a result, the indication may support efficient provisioning of initializing UE 115-*a* and/or UE 115-*b* to receive the requested data from base station 105-*a* on a multicast control channel.

Wireless communications system 200 may be an evolved packet system (EPS), and may support base station 105-*a* broadcasting or multicasting data using non-access stratum (NAS) message and EPS session management (ESM) Data Transport message. A ESM Data Transport message may include an EPS bearer identity. The EPS bearer identity in the ESM Data Transport message may configure data radio bearers for transmission of data.

In some examples of wireless communications system 200, UE 115-*a* or UE 115-*b* may receive eMBMS based on receiving a configuration message from base station 105-*a*. A configuration message may include a SCPTM configuration.

In some examples, UE 115-*a* or UE 115-*b* may receive SCPTM configuration in idle mode or in a connected mode. In one case, UE 115-*a* or UE 115-*b* may identify a SCPTM service, e.g., eMBMS services available for subscription based on a TMGI. Base station 105-*a* may provide mapping between group radio network temporary identifiers (G-RNTI) and TMGI using SC-MCCH. When base station 105-*a* provides control configuration such as a TMGI and G-RNTI mapping, UE 115-*a* and/or UE 115-*b* may monitor the SC-MCCH to identify an eMBMS service available for subscription. UE 115-*a* or UE 115-*b* may then receive a SCPTM configuration by monitoring physical downlink control channel (PDCCH) associate with the corresponding G-RNTI. As a result, UE 115-*a* and/or UE 115-*b* may receive eMBMS data associated with SCPTM service via a control channel.

Thus, wireless communications system 200 may multicast or broadcast data to UEs 115 by configuring SC-MCCH logical channel to multicast or broadcast segments of (e.g., eMBMS) data to requesting UEs. In some cases, multicasting or broadcasting data to UEs may be configured by concatenating and segmenting data at an RLC layer. Concatenating data at the RLC layer may include multiplexing the data with SCPTM configuration messages. Additionally or alternatively, data having a data size exceeding dimensions of a transport block (TB) may be segmented in multiple protocol data units (PDUs). The TB may include information such as, an RLC header or a length and sequence number fields, or a combination thereof.

A TB may also include instructions for UE 115-*a* or UE 115-*b* to reassemble data after receiving the segmented data from base station 105-*a*. Additionally or alternatively, the segmented data may be transmitted to a MAC layer via multiple MAC PDU subframes. The multiple MAC PDU subframes may be transmitted during a SC-MCCH duration. In some examples, a MAC PDU subframe may be transmitted to the MAC layer of base station 105-*a* based on sending a grant for system change radio network temporary identifier (SC-RNTI). Additionally or alternatively, because base station 105-*a* may transmit more than one MAC PDU during a SC-MCCH duration, a SC-MCCH repetition period may be adjusted. SC-MCCH repetition period may be a duration between two SC-MCCH durations associated with broadcasting or multicasting data. In some cases, SC-MCCH repetition period may be adjusted as a result of extending SC-MCCH durations for transmitting multiple MAC PDU subframes. This is described in more detail elsewhere herein, including with reference to FIG. 5.

In some examples, wireless communications system 200 may support broadcasting or multicasting data by configuring existing radio resource control (RRC) messages and downlink (DL) information transfer messages above an RLC layer. Alternatively, wireless communications system 200 may support broadcasting or multicasting data by associating segmented data with a NAS message and DL Generic NAS transport message. Some examples of wireless communications system 200 may include base station 105-*a* transmitting multicast or broadcast data to different groups of UE devices.

For example, UE 115-*a* and UE 115-*b* may be associated with a first group of UEs 115 in a geographic region (e.g., geographic coverage area 110). Alternatively, UE 115-*a* and UE 115-*b* may be associated with a different group of UEs 115 in different geographic regions. Based station 105-*a* may multicast or broadcast data concurrently to UEs 115 associated with a same or different group of UEs based on information provided in a header of TB. The header information may identify different services associated with the data. For example, the information in the header may include TMGI (non-IP data), or a service ID (non-IP data), or a group ID (non-IP data), or a user data protocol (UDP)/IP header with destination IP address and UDP port (IP data), or a combination thereof.

Wireless communications system 200 may support transmitting multicast or broadcast data based on a transmission schedule. A transmission schedule may be associated with multicasting or broadcasting segmented data via the SC-MCCH. The transmission schedule may include multiple transmission opportunity periods, i.e., SC-MCCH modification period. Additionally or alternatively, the transmission schedule may include a start period for multicasting or broadcasting the segmented data via the SC-MCCH. In some examples, a start period may be associated to a particular modification period of the transmission schedule. The transmission schedule may additionally include an end period for suspending multicasting or broadcasting of segmented data via the SC-MCCH. The end period may be associated with a particular modification period. Alternatively, an end period may correspond to a same modification period associated with a start period.

For example, base station 105-*a* may multicast or broadcast the segmented data during the SC-MCCH modification periods based on the transmission start period and the transmission end period in the transmission schedule. Because of the multicasting or broadcasting data (e.g., eMBMS data) via SC-MCCH logical channel, base station 105-*a* may transmit an indication to UE 115-*a* or UE 115-*b* device indicating the transmission via the SC-MCCH logical channel before multicasting or broadcasting to the UE 115-*a* or UE 115-*b*. For example, a user service description (USD) may be transmitted as an indication of an upcoming transmission of multicast or broadcast data. This is described in further detail elsewhere herein, including with reference to FIG. 6.

Alternatively, base station 105-*a* may multicast or broadcast data based on a discontinuous transmission schedule. In some examples, base station 105-*a* may transmit a direction indication information (DII) message to UE 115-*a* or UE 115-*b*. The DII message may be configured based on a category of UE 115-*a* and UE 115-*b*. For example, the DII message may be a DCI N2 message based on UE 115-*a* or UE 115-*b* categorized as CAT-NB1. Alternatively, the DII message may be a DCI 6-2 message based on UE 115-*a* or UE 115-*b* categorized as CAT-M1.

The DII message, in some examples, may indicate an upcoming SC-MCCH data transmission. A discontinuous transmission schedule may include multiple discontinuous SC-MCCH modification periods. The SC-MCCH modification period being a period for multicasting or broadcasting data to UE 115-*a* or UE 115-*b*. In some examples, the discontinuous transmission schedule may include periods where the DII message may be transmitted to UE 115-*a* or UE 115-*b* to indicate an upcoming multicasting or broadcasting of data to UE 115-*a* or UE 115-*b*. In some cases, a DII message can be transmitted during a page occasion (PO) of the discontinuous transmission schedule. UE 115-*a* or UE 115-*b* may monitor a PO and detect a DII message indicating an upcoming SC-MCCH control plane data transmission from base station 105-*a*. This is described in further detail elsewhere herein, including with reference to FIG. 7.

Figure 3:
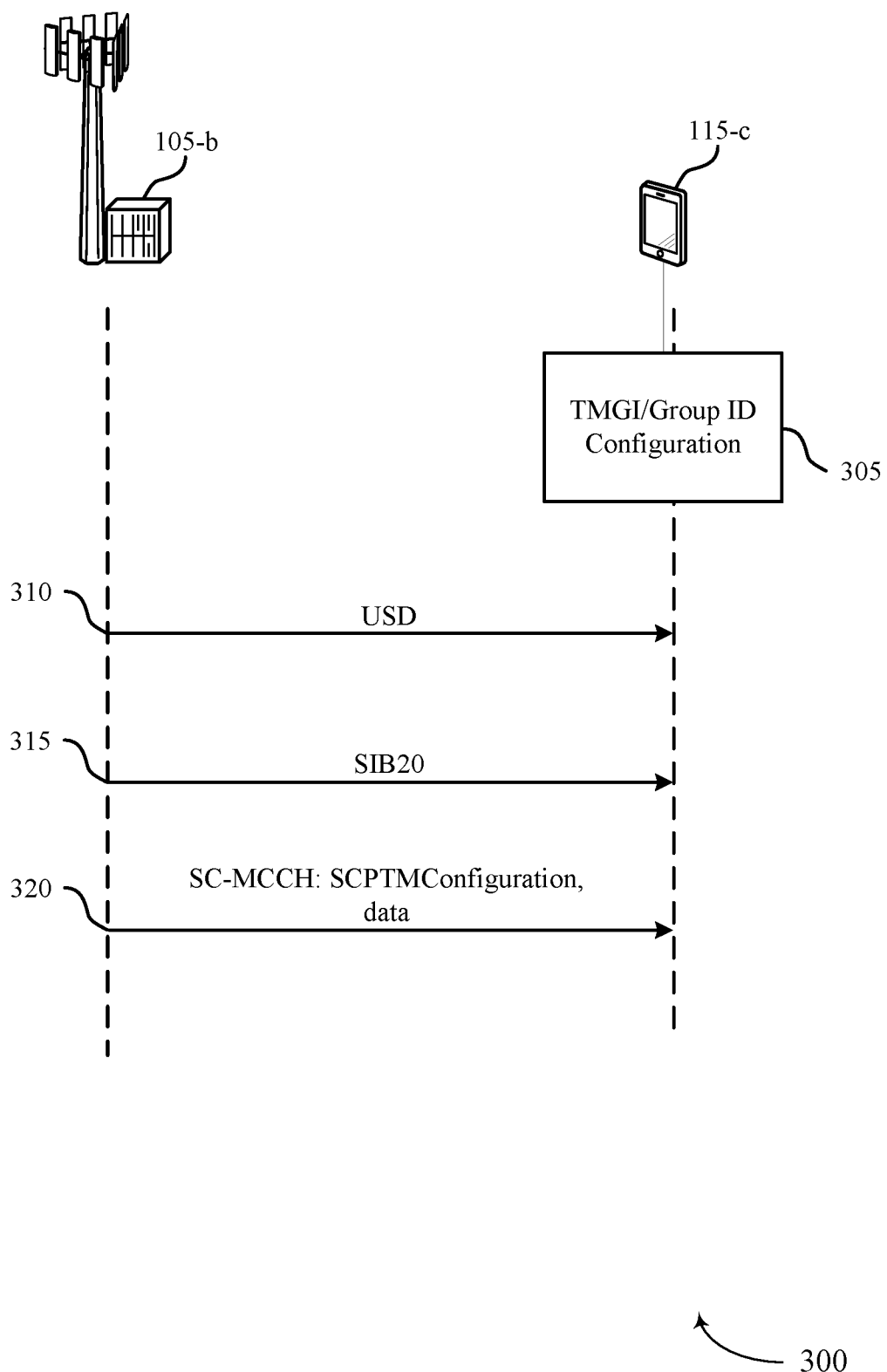
FIG. 3 illustrates an example of a process flow that supports multicasting or broadcasting data in a wireless communication system in accordance with aspects of the present disclosure.

FIG. 3 illustrates an example of a process flow 300 that supports multicasting or broadcasting data in a wireless communication system in accordance with aspects of the present disclosure. In some cases, process flow 300 may represent aspects of techniques performed by base station 105-*a* and UE 115-*a* or UE 115-*b* as described with reference to FIG. 2. Process flow 300 may represent an example of a process by which base station 105-*a* may improve transmitting broadcasting or multicasting data to UE 115-*c* by reducing messages transmitted between base station 105-*a* and UE 115-*c* before broadcasting or multicasting data to the UE 115-*c*.

At step 305, UE 115-*c* may configure a TMGI or a group ID. Configuring TMGI or group ID may include UE 115-*c* transmitting a request for an eMBMS service to base station 105-*b*. In some examples, the request may identify the TMGI or the group ID associated with an eMBMS service. Additionally or alternatively, the request may include additional information different from the TMGI or the group ID. For example, the request may include a service ID or a destination IP address and UDP port associated with an eMBMS service. Additionally or alternatively, UE 115-*c* may transmit an indication to base station 105-*b* indicating capability of UE 115-*c* to receive broadcasting or multicasting data.

At step 310, base station 105-*b* may transmit USD to UE 115-*c*. USD may include information associated with the TMGI or group ID. For example, USD may indicate a plurality of eMBMS services available for subscription for UE 115-*c*. In some cases, USD may indicate a timing of an eMBMS service available for subscription.

At step 315, base station 105-*b* may transmit SIB20 to UE 115-*c*. SIB20 may include control information associated with UE 115-*c*. Control information may indicate to UE 115-*c* upcoming transmission of eMBMS service data on a multicast control channel.

At step 320, base station 105-*b* may transmit a SC-MCCH SCPTM configuration message to UE 115-*c*. A SC-MCCH SCPTM configuration message may indicate to UE 115-*c* a new TMGI added to a SC-MCCH logical channel. The SC-MCCH SCPTM configuration may be transmitted on the SC-MCCH. Additionally, data may be transmitted on the SC-MCCH. In some examples, the data may be multiplexed with the SC-MCCH SCPTM configuration or SC-MCCH control information, or both.

Figure 4:
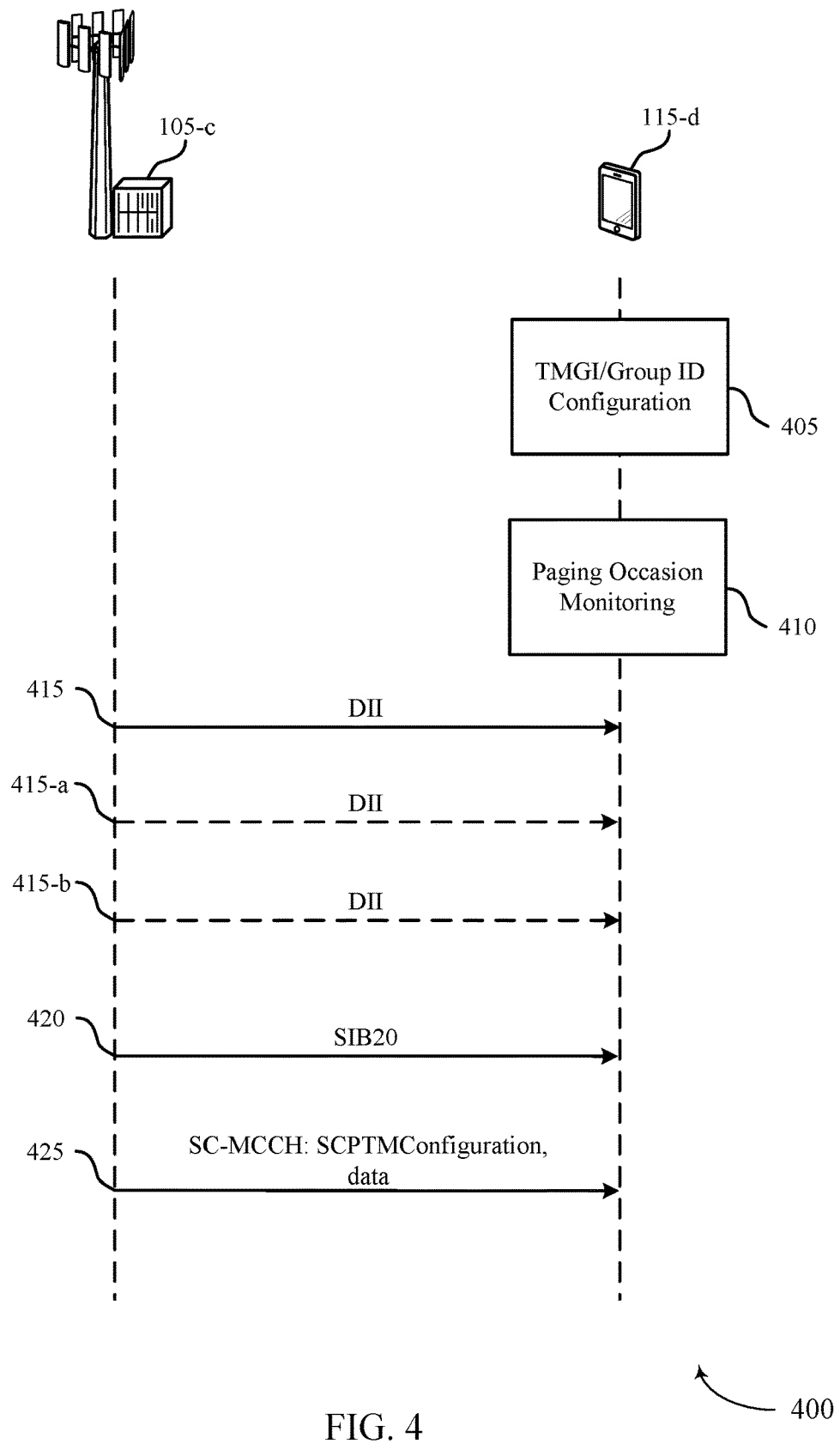
FIG. 4 illustrates an example of a process flow that supports multicasting or broadcasting data in a wireless communication system in accordance with aspects of the present disclosure.

FIG. 4 illustrates an example of a process flow 400 that supports multicasting or broadcasting data in a wireless communication system in accordance with aspects of the present disclosure. In some cases, process flow 400 may represent aspects of techniques performed by base station 105-*a* and UE 115-*a* or UE 115-*b* as described with reference to FIG. 2. Process flow 400 may represent an example of a process by which base station 105-*c* may improve transmitting broadcasting or multicasting data to UE 115-*d* by reducing messages transmitted between base station 105-*a* and UE 115-*c* before broadcasting or multicasting data to the UE 115-*c*.

At step 405, UE 115-*d* may configure a TMGI or a group ID. Configuring TMGI or group ID may include UE 115-*d* transmitting a request for an eMBMS service to base station 105-c. In some examples, the request may identify the TMGI or the group ID associated with an eMBMS service. Additionally or alternatively, the request may include additional information different from the TMGI or the group ID. For example, the request may include a service ID or the group ID associated with an eMBMS service. Additionally or alternatively, UE 115-d may transmit an indication to base station 105-c indicating capability of UE 115-d to receive broadcasting or multicasting data for an eMBMS service.

At step 410, UE 115-d may initialize monitoring a paging occasion. During a paging occasion UE 115-d may receive one or more messages associated with an eMBMS service. For example, base station 105-c may transmit one or more messages associated with the eMBMS service to UE 115-d during a paging occasion. In one case, base station 105-c may transmit one or more message associated with the eMBMS service via a paging control channel.

At step 415, base station 105-c may transmit a DII message to UE 115-d. A DII message may include information associated with a plurality of eMBMS services available for subscription. In some examples, base station 105-c may transmit a DII to UE 115-d during a paging occasion. Additionally or alternatively, base station 105-c may transmit more than one DII message to UE 115-d during another paging occasion. For example, at step 415-a, base station 105-c may transmit a second DII message. At step 415-b, base station 105-c may, additionally or alternatively, transmit a third DII message to UE 115-d.

At step 420, base station 105-c may transmit SIB20 to UE 115-d. SIB20 may include control information to UE 115-d. Control information may indicate to UE 115-d upcoming transmission of eMBMS service data on a multicast control channel. In some cases, base station 105-c may transmit SIB20 to UE 115-d. At step 425, base station 105-c may transmit a SC-MCCH: SCPTM configuration message to UE 115-d. The SC-MCCH SCPTM configuration may be transmitted on the SC-MCCH. Additionally, data may be transmitted on the SC-MCCH. In some examples, the data may be multiplexed with the SC-MCCH SCPTM configuration or SC-MCCH control information, or both.

Figure 5:
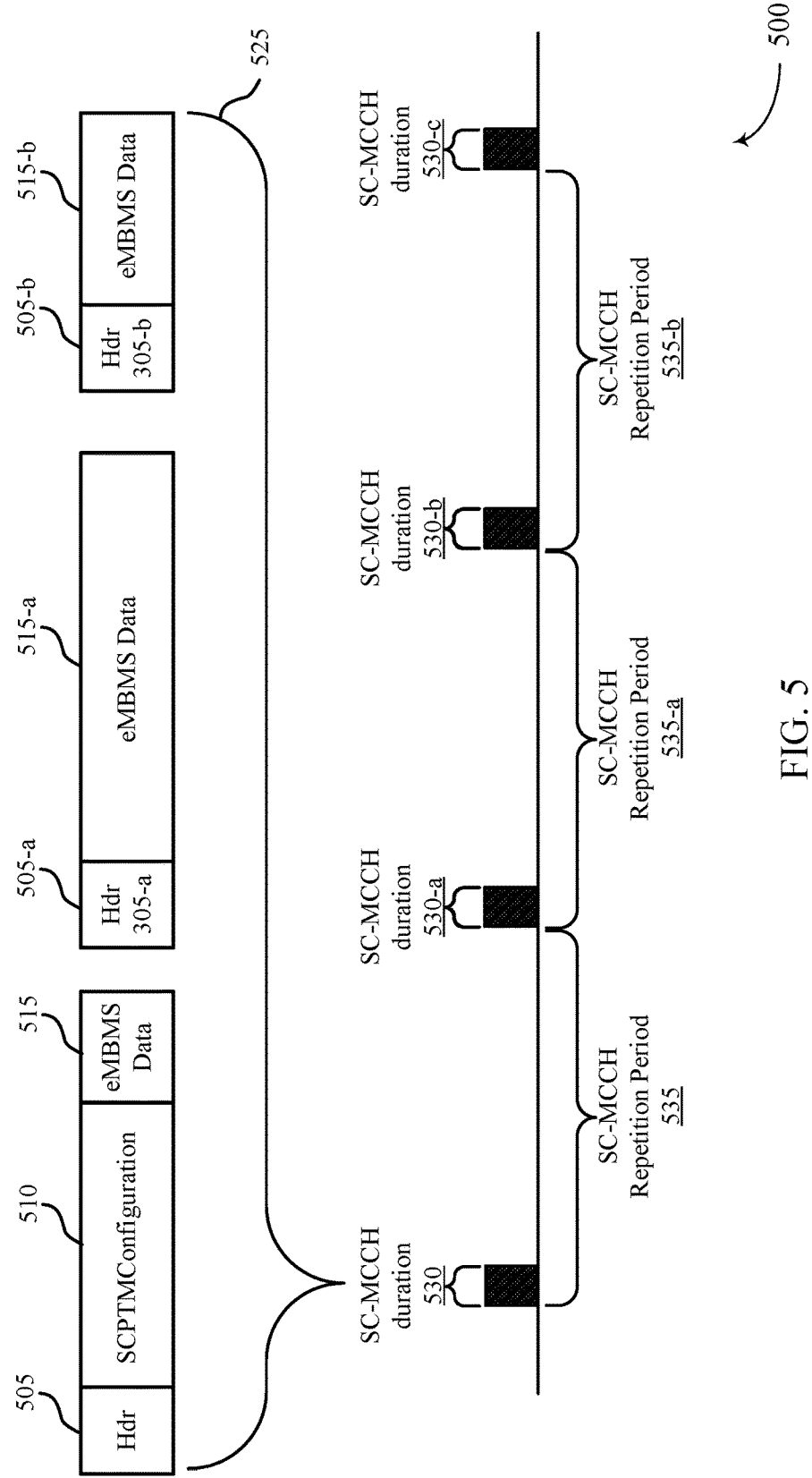
FIG. 5 illustrates an example of a segmentation and concatenation configuration that supports multicasting or broadcasting data in accordance with aspects of the present disclosure.

FIG. 5 illustrates an example of a segmentation and concatenation configuration 500 that supports multicasting or broadcasting data in accordance with aspects of the present disclosure. In some cases, segmenting and concatenation configuration 500 may represent aspects of techniques performed by base station 105 as described with reference to FIGS. 1 and 2.

In some cases, the segmenting and concatenation configuration 500 may be performed at an RLC layer. Concatenating data at the RLC layer may include multiplexing the data with SCPTM configuration data such as SCPTM configuration 510. Additionally or alternatively, data having a data size exceeding dimensions of a transport block (TB) may be segmented in multiple protocol data units (PDUs). The TB may include information in a header such as, an RLC header or a length and sequence number fields, or a combination thereof.

Segmentation and concatenation configuration 500 may improve multicasting or broadcasting data to UEs by configuring SC-MCCH logical channel to transmit segments of multicast or broadcast data to requesting UEs 115. For example, multicast or broadcast data may be segmented into subframes 525. A first subframe of broadcast or multicast data may include a header 505, a SCPTM configuration 510, and a subset of eMBMS data 515. Header 505 may include information associated with SCPTM configuration 510 or eMBMS data 515, or both. Additionally, header 505 may include a size identifier associated with the SCPTM configuration 510 or eMBMS data 515, or both. The size identifier may indicate a length of SCPTM configuration 510 or eMBMS data 515, or both. In some examples, eMBMS data 515 may include an identifier; for example, a TMGI, or a service ID, or a group ID, a destination IP address and UDP port, or a combination thereof. In some examples, SCPTM configuration 510 may include information indicating a control channel on which eMBMS data is transmitted on. For example, SCPTM configuration 510 may indicate to a UE that eMBMS data may be received on a multicast control channel.

In some examples, eMBMS data 515 may include a subset of requested eMBMS data associated with an eMBMS service. In some cases of the segmenting and concatenation configuration 500, a second subframe of the broadcast or multicast data may include a header 505-a and eMBMS data 515-a. In some examples, header 505-a may include information associated with eMBMS data and a size identifier indicating a length of the eMBMS data. In some examples, eMBMS data 515-a may include another subset of eMBMS data 515. Additionally, based on a size of requested eMBMS data, the eMBMS data may be segmented into a third subframe that may include header 505-b and eMBMS data 515-b. The concatenated and segmented data in different subframe may be transmitted to a MAC layer via multiple MAC PDU subframes. The multiple MAC PDU subframes may be transmitted during a SC-MCCH duration. For example, subframes 525 may be an example of MAC PDU subframes and SC-MCCH duration may be an example of SC-MCCH duration 530, 530-a, 530-b, or 530-c. In some examples, one or more SC-MCCH durations may be separated by a SC-MCCH repetition period (e.g., SC-MCCH repetition period 535, 535-a, or 535-b). For example, SC-MCCH duration 530 and SC-MCCH duration 530-a may be separated by SC-MCCH repetition period 535.

In some cases, one or more MAC PDU subframes (e.g., subframes 525) may be transmitted during SC-MCCH duration 530. Additionally or alternatively, when more than one MAC PDU subframe may be transmitted during a SC-MCCH duration, more than one bandwidth grant is allocated during a SC-MCCH duration.

Figure 6:
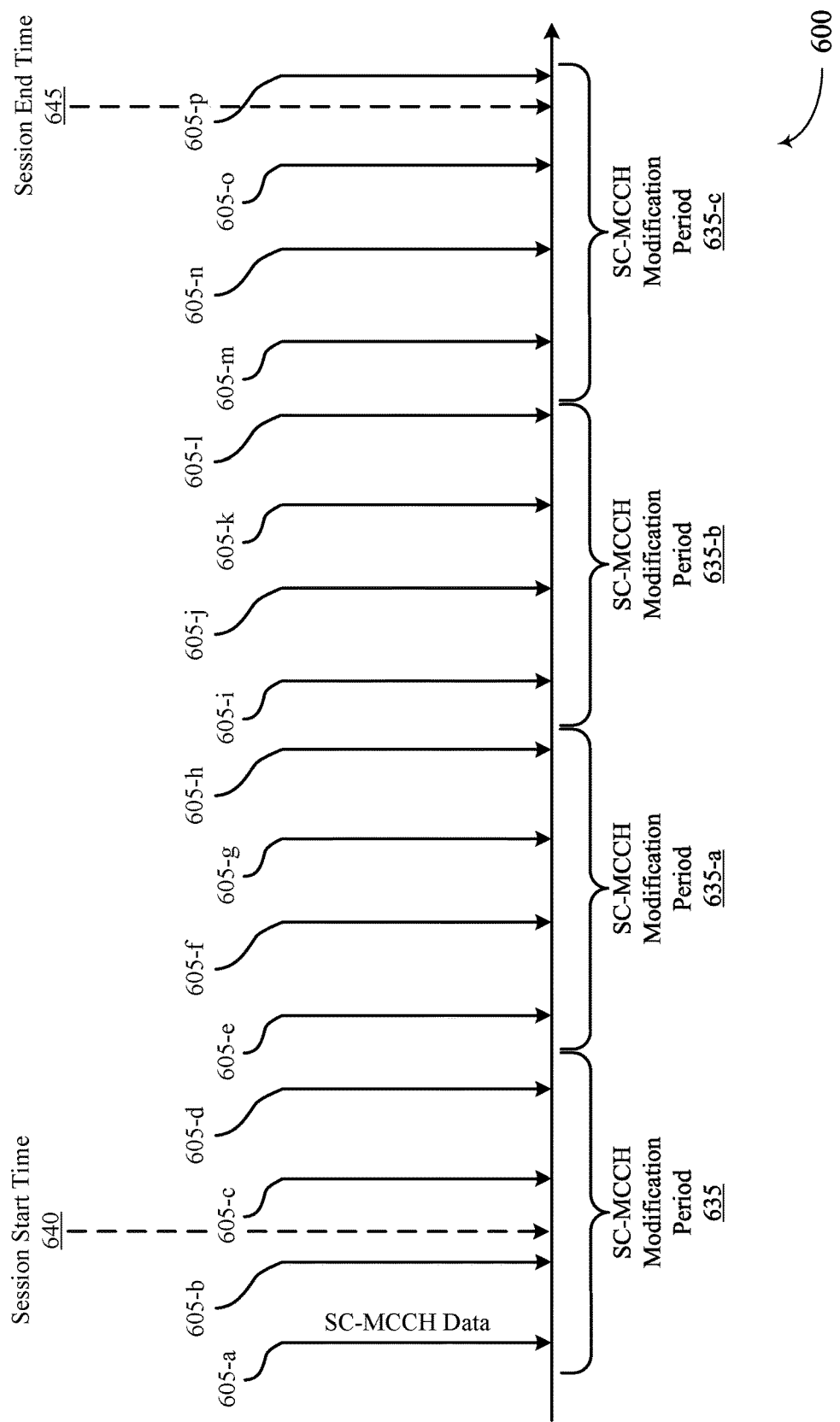
FIG. 6 illustrates an example of a transmission configuration that supports multicasting or broadcasting data in accordance with aspects of the present disclosure.

FIG. 6 illustrates an example of a transmission configuration 600 that supports multicasting or broadcasting data in accordance with aspects of the present disclosure. In some cases, transmission configuration 600 may represent aspects of techniques performed by base station 105 or UE 115 as described with reference to FIGS. 1 and 2. Transmission configuration 600 may be an example of a transmission schedule for broadcasting or multicasting segmented data via a control channel. The transmission schedule may include multiple transmission opportunity periods, i.e., SC-MCCH modification periods 635, 635-a, 635-b, or 635-c.

Additionally or alternatively, transmission configuration 600 may include a session start time 640 for transmitting segmented multicast or broadcast data via a control channel. In some examples, a session start time may be associated to a particular modification period of the transmission schedule. For example, session start time 640 may be associated with SC-MCCH modification periods 635. In some examples, a session start time may be at a beginning of a SC-MCCH modification period, or before an end of a SC-MCCH modification period, or an instance in between a beginning and an end of a SC-MCCH modification period.

In some examples, transmission configuration 600 may include a session end time 645 for suspending transmission of segmented multicast or broadcast data via the control channel. In some examples, a session end time may be associated to a particular modification period of the transmission schedule. For example, session end time 645 may be associated with SC-MCCH modification period 635-c. In some examples, a session end time may be at a beginning of a SC-MCCH modification period, or before an end of a SC-MCCH modification period, or an instance in between a beginning and an end of a SC-MCCH modification period. The transmission configuration 600 may be an example of a transmission schedule for broadcasting or multicasting segmented data via a control channel.

Figure 7:
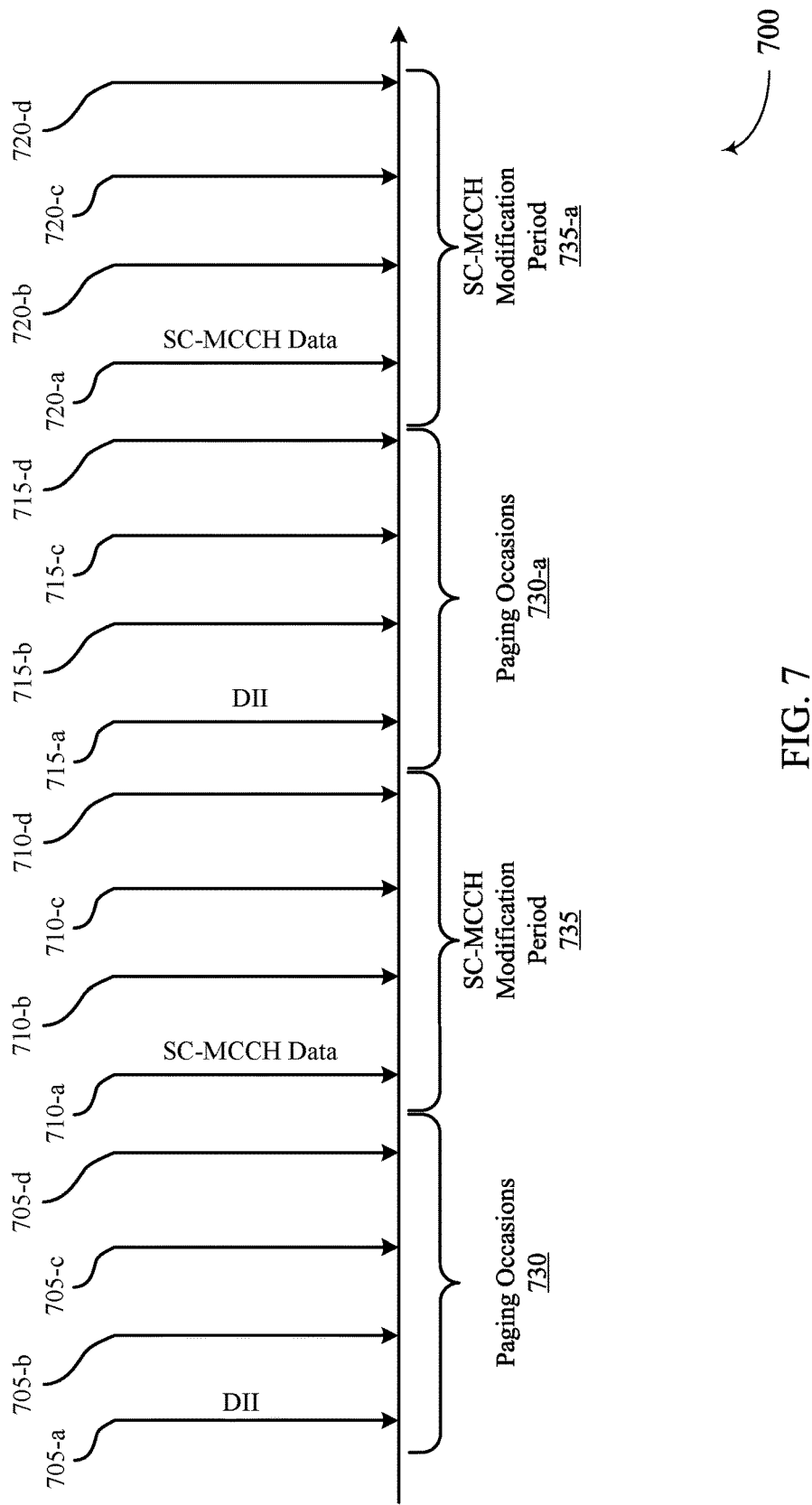
FIG. 7 illustrates an example of a transmission configuration that supports multicasting or broadcasting data in accordance with aspects of the present disclosure.

FIG. 7 illustrates an example of a transmission configuration 700 that supports multicasting or broadcasting data in accordance with aspects of the present disclosure. In some cases, transmission configuration 700 may represent aspects of techniques performed by base station 105 or UE 115 as described with reference to FIGS. 1 and 2. Transmission configuration 700 may be an example of a transmission schedule for broadcasting or multicasting segmented data via a control channel.

In some examples, transmission configuration 700 may be an example of a discontinuous transmission schedule. For example, base station 105 may transmit DII messages (e.g., DII messages 705-a, 705-b, 705-c, or 705-d) to one or more UEs 115 during a few paging occasions 730 as described above. In one case, each of paging occasions 730 or 730-a may be a first period of a discontinuous transmission schedule and the actual offset in the period of each of the paging occasions 730 or 730-a may be associated with the at least one eMBMS service, such as its temporary mobile group identity (TMGI) or group ID. Additionally or alternatively, base station 105 may transmit broadcasting or multicasting segmented data via a control channel during a second period. A second period may be a SC-MCCH modification period. For example, base station 105 may transmit SC-MCCH data 710-a, 710-b, 710-c, or 710-d or SC-MCCH data 720-a, 720-b, 720-c, or 720-d during a SC-MCCH modification period 735 or a SC-MCCH modification period 735-a.

Figure 8:
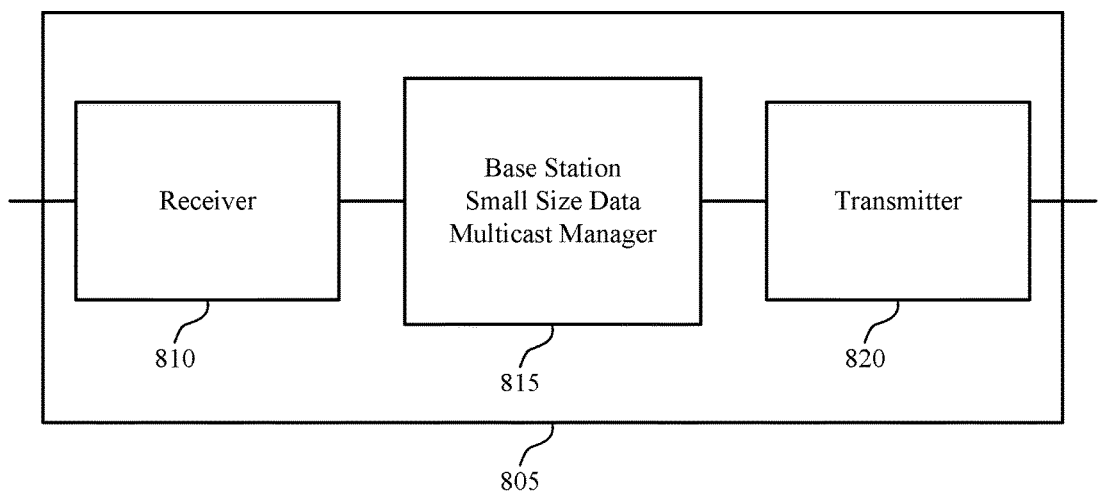
FIGS. 8 through 10 show block diagrams of a device or devices that support multicasting or broadcasting data in accordance with aspects of the present disclosure.

FIG. 8 shows a block diagram 800 of a wireless device 805 that supports multicasting or broadcasting data in accordance with various aspects of the present disclosure. Wireless device 805 may be an example of aspects of a base station 105 as described with reference to FIG. 1. Wireless device 805 may include receiver 810, base station small size data multicast manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to small size data multicast in NB-IOT or eMTC, etc.). Information may be passed on to other components of the device. The receiver 810 may be an example of aspects of the transceiver 1135 described with reference to FIG. 11.

Base station small size data multicast manager 815 may be an example of aspects of the base station small size data multicast manager 1115 described with reference to FIG. 11. Base station small size data multicast manager 815 may transmit a system information block (SIB) indicating a configuration to receive a single-cell multicast control channel (SC-MCCH) for single cell point to multipoint (SCPTM) communication, identify broadcast or multicast data associated with a group of devices which receive at least one evolved multimedia broadcast multicast service (eMBMS) service on a single cell multicast traffic channel (SC-MTCH) of the SCPTM communication, and transmit the data on the SC-MCCH control channel within a time period determined by the configuration.

Additionally or alternatively, base station small size data multicast manager 815 may transmit a system information block (SIB) indicating a configuration to receive a plurality of evolved multimedia broadcast multicast service (eMBMS) services available for subscription on a multicast control channel, identify broadcast or multicast data associated with at least one eMBMS service of the plurality, and transmit the data and a single cell point to multipoint (SCPTM) configuration for the at least one eMBMS service on the multicast control channel.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas. Transmitter 820 may transmit the one or more media access control (MAC) PDUs during a set of subframes within a repetition of the multicast control channel.

Figure 9:
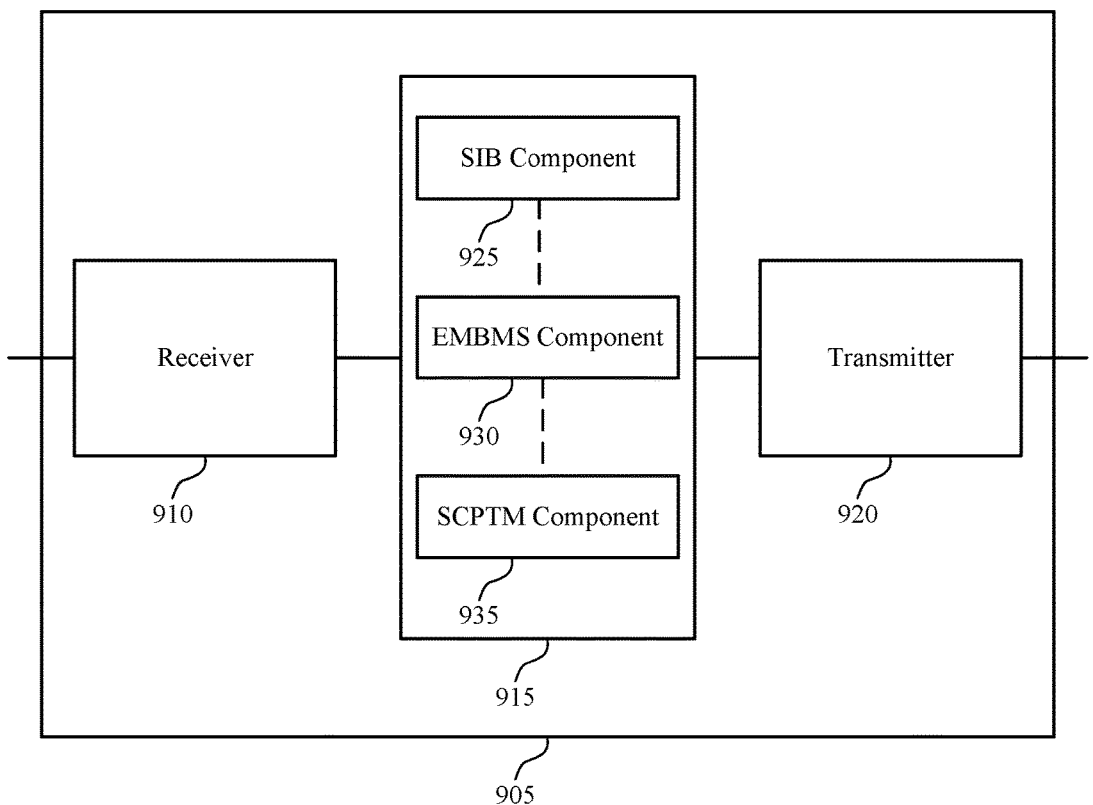

FIG. 9 shows a block diagram 900 of a wireless device 905 that supports multicasting or broadcasting data in accordance with various aspects of the present disclosure. Wireless device 905 may be an example of aspects of a wireless device 805 or a base station 105 as described with reference to FIGS. 1 and 8. Wireless device 905 may include receiver 910, base station small size data multicast manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to small size data multicast in NB-IOT or eMTC, etc.). Information may be passed on to other components of the device. The receiver 910 may be an example of aspects of the transceiver 1135 described with reference to FIG. 11.

Base station small size data multicast manager 915 may be an example of aspects of the base station small size data multicast manager 1115 described with reference to FIG. 11. Base station small size data multicast manager 915 may also include SIB component 925, eMBMS component 930, and SCPTM component 935.

SIB component 925 may transmit a SIB indicating a configuration to receive a plurality of evolved multimedia broadcast multicast service (eMBMS) services available for subscription on a multicast control channel.

The eMBMS component 930 may identify broadcast or multicast data associated with at least one eMBMS service of the plurality, configure the eMBMS service based on the indication, and receive signaling including the data from an eMBMS gateway via a mobility management entity (MME), where the data is identified based on the signaling. In some cases, identifying broadcast or multicast data includes: identifying the data during a first multicast control channel modification period. In some cases, the signaling includes non-access stratum (NAS) signaling, and the message transmitted on the multicast control channel includes a NAS transport message.

SCPTM component 935 may transmit the data and a single cell point to multipoint (SCPTM) configuration for the at least one eMBMS service on the multicast control channel. In some cases, the data is transmitted in a first message and the SCPTM configuration is transmitted in a second message different from the first message. In some cases, identifying the broadcast or multicast data includes: multiplexing the data with the SCPTM configuration at a radio link control (RLC) protocol entity. In some cases, transmitting the data includes: transmitting the data during the first multicast control channel modification period. In some cases, transmitting the data includes: transmitting the data during a second multicast control channel modification period after the first multicast control channel modification period. In some cases, transmitting the data includes: transmitting the data during a set of multicast control channel modification periods that each include a set of repetitions of the multicast control channel.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
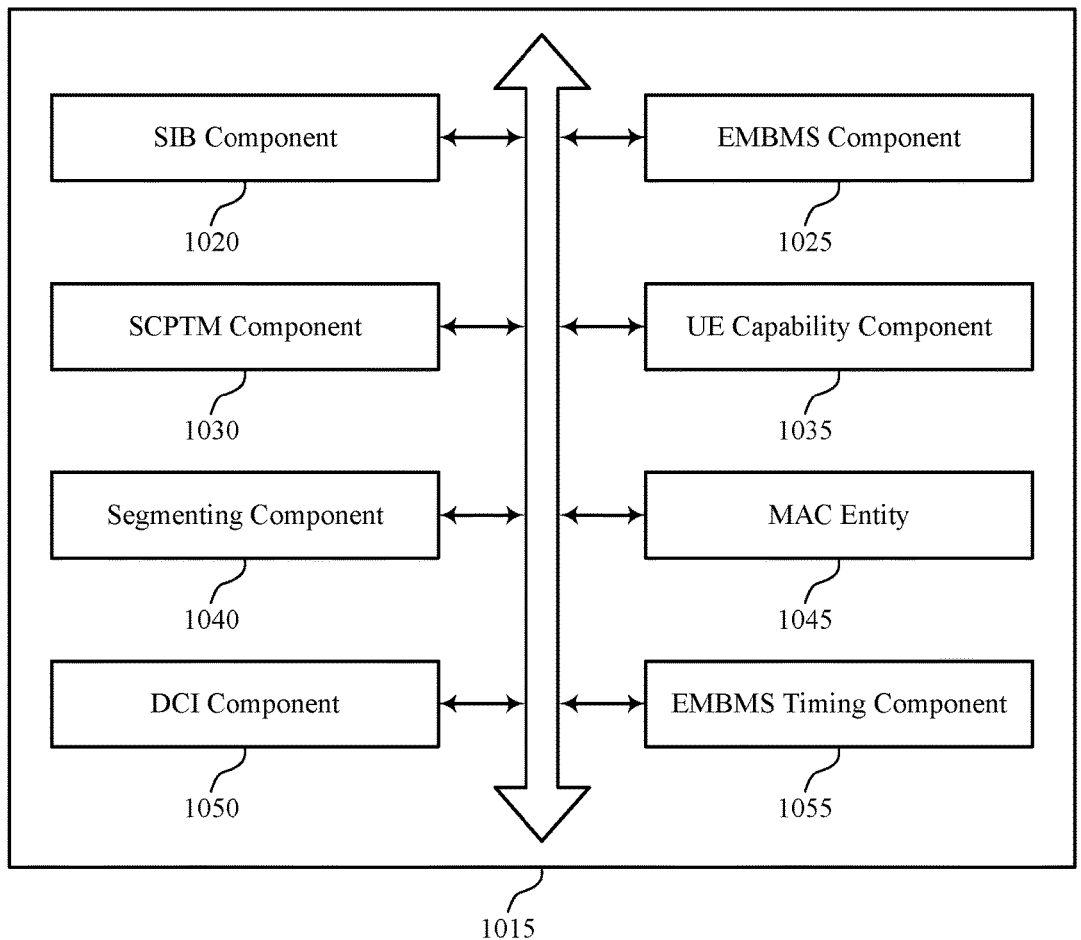

FIG. 10 shows a block diagram 1000 of a base station small size data multicast manager 1015 that supports multicasting or broadcasting data in accordance with various aspects of the present disclosure. The base station small size data multicast manager 1015 may be an example of aspects of a base station small size data multicast manager 815, a base station small size data multicast manager 915, or a base station small size data multicast manager 1115 described with reference to FIGS. 8, 9, and 11. The base station small size data multicast manager 1015 may include SIB component 1020, eMBMS component 1025, SCPTM component 1030, user equipment (UE) capability component 1035, segmenting component 1040, MAC entity 1045, downlink control information (DCI) component 1050, and eMBMS timing component 1055. Each of these modules may communicate, directly or indirectly, with one another (e.g., via one or more buses).

SIB component 1020 may transmit a SIB indicating a configuration to receive a plurality of evolved multimedia broadcast multicast service (eMBMS) services available for subscription on a multicast control channel.

The eMBMS component 1025 may identify broadcast or multicast data associated with at least one eMBMS service of the plurality, configure the eMBMS service based on the indication, and receive signaling including the data from an eMBMS gateway via a mobility management entity (MME), where the data is identified based on the signaling. In some cases, identifying broadcast or multicast data includes: identifying the data during a first multicast control channel modification period. In some cases, eMBMS component 1025 may identify an identifier of the data. In some cases, the identifier includes at least one of a temporary mobile group identity (TMGI), or a service ID, or a group ID, or a destination internet protocol (IP) address and UDP port, or a combination thereof SCPTM component 1030 may transmit the data and a single cell point to multipoint (SCPTM) configuration for the at least one eMBMS service on the multicast control channel. In some cases, the data is transmitted in a first message and the SCPTM configuration is transmitted in a second message different from the first message. In some cases, identifying the broadcast or multicast data includes: multiplexing the data with SCPTM configuration data on the SC-MCCH and/or multiplexing the data with the SCPTM configuration at a RLC protocol entity. In some cases, multiplexing the data may be performed at a radio link control (RLC) layer of a wireless communication protocol. UE capability component 1035 may receive an indication of a UE capability for the eMBMS service of the plurality of eMBMS services.

Segmenting component 1040 may segment the data into one or more RLC protocol data units (PDUs) that each include an RLC header. In some cases, one of the RLC PDUs includes the SCPTM configuration and a first portion of the data and another of the RLC PDUs includes a second portion of the data. In some cases, the RLC header includes at least one of framing information, a length of the segment, or a sequence number, or any combination thereof.

MAC entity 1045 may generate one or more medium access control (MAC) PDUs that each include one of the RLC PDUs. DCI component 1050 may transmit downlink control information that assigns resources of the set of subframes associated with each MAC PDU. Additionally or alternatively, DCI component 1050 may transmit a plurality of grants for the SC-MCCH on a downlink control channel, and wherein transmitting the data on the SC-MCCH comprises transmitting a plurality of MAC packets within a duration associated with the plurality of grants.

The eMBMS timing component 1055 may transmit a message that indicates timing associated with the eMBMS services available for subscription. In some cases, the message that indicates the timing includes user service description (USD). In some cases, the message that indicates the timing includes direction indication information (DII). In some cases, the DII is transmitted during a paging occasion (PO) that is associated with the at least one eMBMS service, such as its temporary mobile group identity (TMGI) or group ID.

Figure 11:
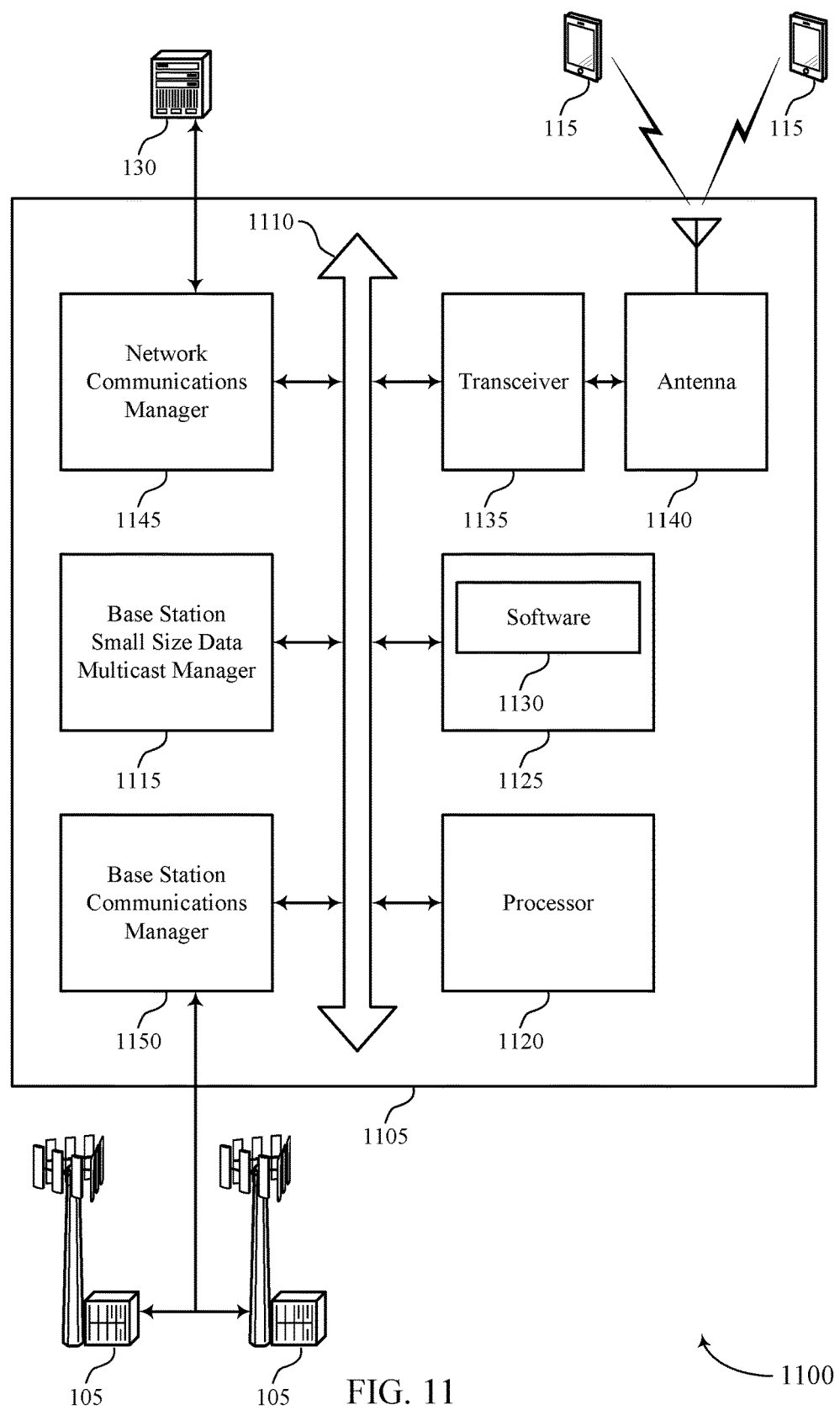
FIG. 11 illustrates a block diagram of a system, including a base station, that supports multicasting or broadcasting data in accordance with aspects of the present disclosure.

FIG. 11 shows a diagram of a system 1100 including a device 1105 that supports multicasting or broadcasting data in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station small size data multicast manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting small size data multicast in NB-IOT or eMTC).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support small size data multicast in NB-IOT or eMTC. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an Long Term Evolution (LTE)/LTE-A wireless communication network technology to provide communication between base stations 105.

Figure 12:
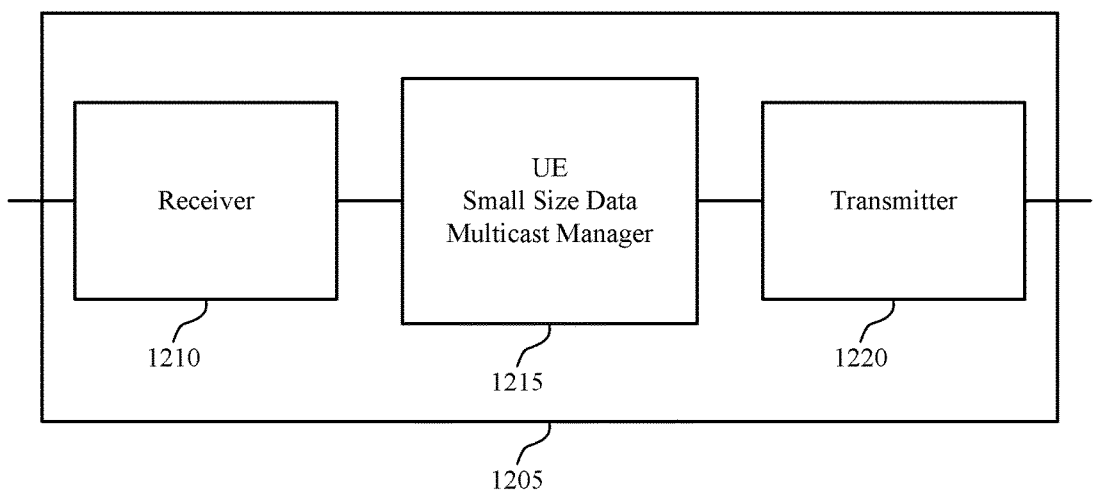
FIGS. 12 through 14 show block diagrams of a device or devices that support multicasting or broadcasting data in accordance with aspects of the present disclosure.

FIG. 12 shows a block diagram 1200 of a wireless device 1205 that supports multicasting or broadcasting data in accordance with various aspects of the present disclosure. Wireless device 1205 may be an example of aspects of a UE 115 as described with reference to FIG. 1. Wireless device 1205 may include receiver 1210, UE small size data multicast manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to small size data multicast in NB-IOT or eMTC, etc.). Information may be passed on to other components of the device. The receiver 1210 may be an example of aspects of the transceiver 1535 described with reference to FIG. 15.

UE small size data multicast manager 1215 may be an example of aspects of the UE small size data multicast manager 1515 described with reference to FIG. 15.

UE small size data multicast manager 1215 may receive a SIB indicating a configuration to receive a plurality of evolved multimedia broadcast multicast service (eMBMS) services available for subscription on a multicast control channel and receive broadcast or multicast data and a single cell point to multipoint (SCPTM) configuration for at least one eMBMS of the plurality of eMBMS services on the multicast control channel.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
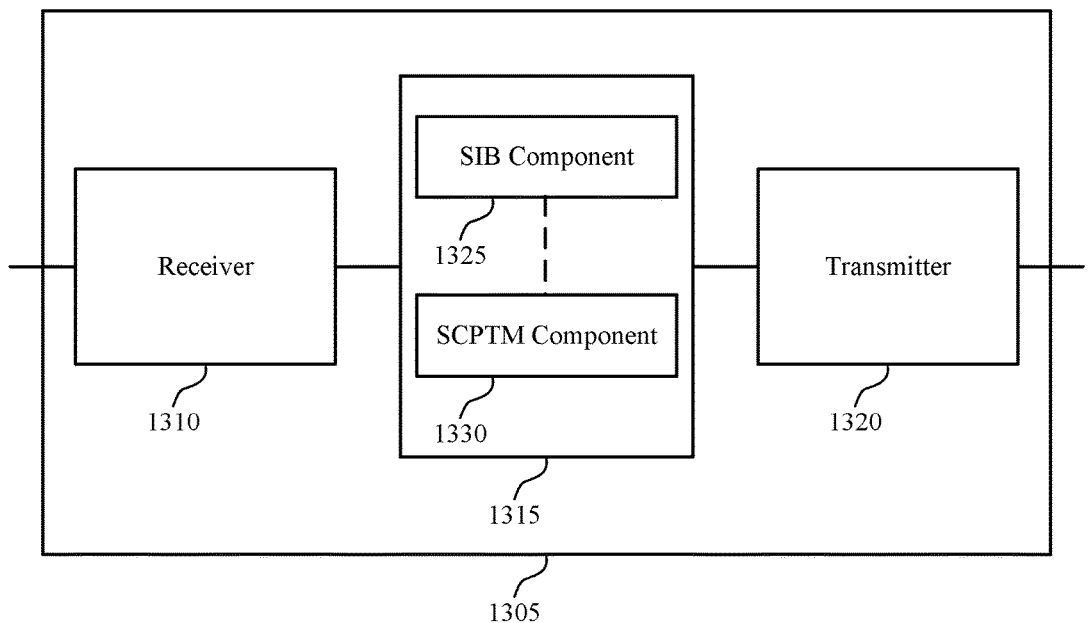

FIG. 13 shows a block diagram 1300 of a wireless device 1305 that supports multicasting or broadcasting data in accordance with various aspects of the present disclosure. Wireless device 1305 may be an example of aspects of a wireless device 1205 or a UE 115 as described with reference to FIGS. 1 and 12. Wireless device 1305 may include receiver 1310, UE small size data multicast manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to small size data multicast in NB-IOT or eMTC, etc.). Information may be passed on to other components of the device. The receiver 1310 may be an example of aspects of the transceiver 1535 described with reference to FIG. 15.

UE small size data multicast manager 1315 may be an example of aspects of the UE small size data multicast manager 1515 described with reference to FIG. 15. UE small size data multicast manager 1315 may also include SIB component 1325 and SCPTM component 1330.

SIB component 1325 may receive a SIB indicating a configuration to receive a plurality of evolved multimedia broadcast multicast service (eMBMS) services available for subscription on a multicast control channel. SCPTM component 1330 may receive broadcast or multicast data and a single cell point to multipoint (SCPTM) configuration for at least one eMBMS of the plurality of eMBMS services on the multicast control channel, receive the broadcast or multicast data during a first multicast control channel modification period based on the USD, and receive the DII or the eMBMS services available for subscription during the PO. In some cases, the broadcast or multicast data is received in a first message and the SCPTM configuration is received in a second message different from the first message. In some cases, the eMBMS services available for subscription include a user service description (USD). In some cases, the eMBMS services available for subscription include direction indication information (DII).

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
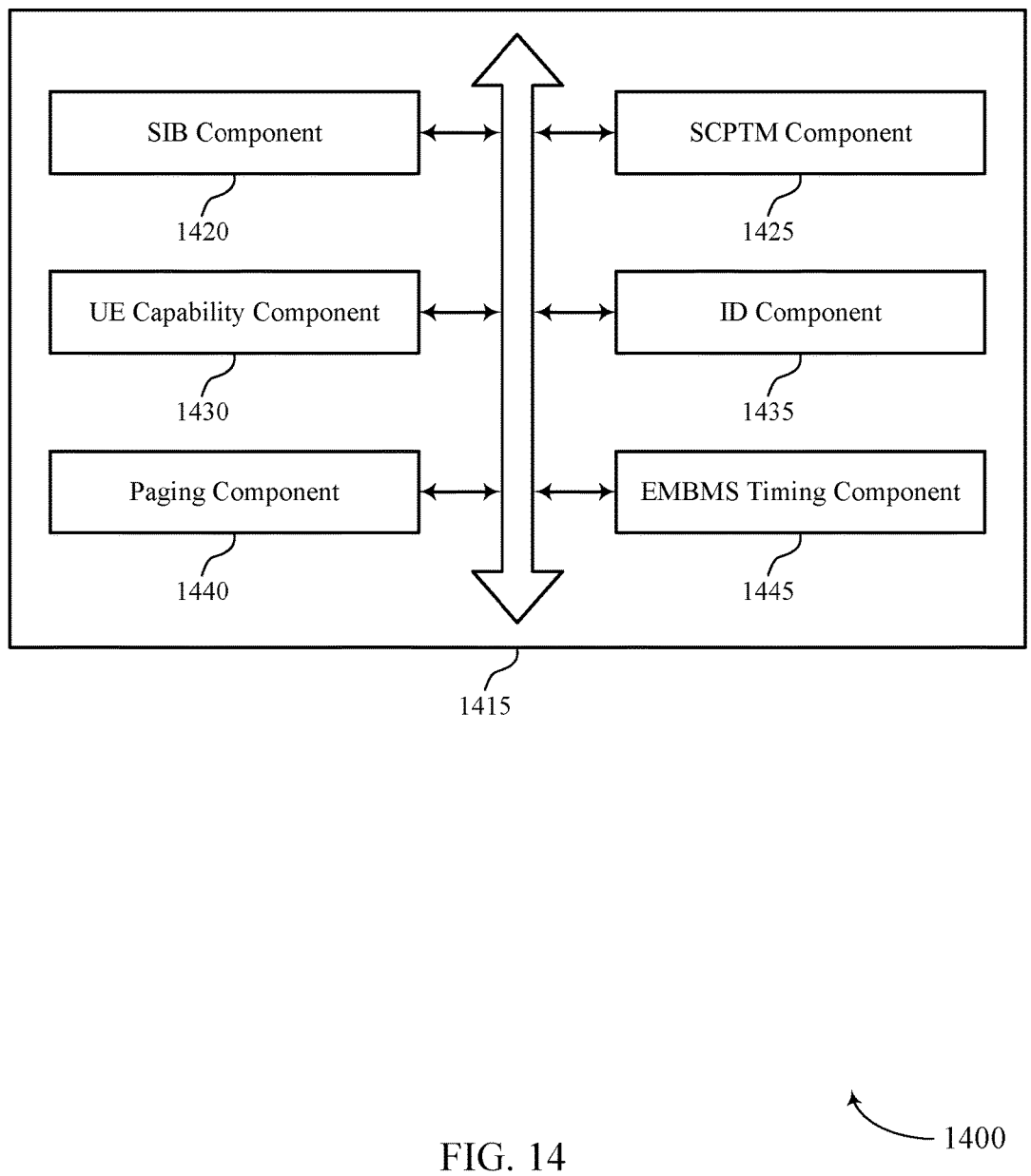

FIG. 14 shows a block diagram 1400 of a UE small size data multicast manager 1415 that supports multicasting or broadcasting data in accordance with various aspects of the present disclosure. The UE small size data multicast manager 1415 may be an example of aspects of a UE small size data multicast manager 1515 described with reference to FIGS. 12, 13, and 15. The UE small size data multicast manager 1415 may include SIB component 1420, SCPTM component 1425, UE capability component 1430, ID component 1435, paging component 1440, and eMBMS timing component 1445. Each of these modules may communicate, directly or indirectly, with one another (e.g., via one or more buses).

SIB component 1420 may receive a SIB indicating a configuration to receive a plurality of evolved multimedia broadcast multicast service (eMBMS) services available for subscription on a multicast control channel. SCPTM component 1425 may receive broadcast or multicast data and a single cell point to multipoint (SCPTM) configuration for at least one eMBMS of the plurality of eMBMS services on the multicast control channel, receive the broadcast or multicast data during a first multicast control channel modification period based on the USD, and receive the DII or the eMBMS services available for subscription during the PO. In some cases, the broadcast or multicast data is received in a first message and the SCPTM configuration is received in a second message different from the first message. In some cases, the eMBMS services available for subscription include a user service description (USD). In some cases, the eMBMS services available for subscription include direction indication information (DII).

UE capability component 1430 may transmit an indication of capability for an eMBMS service of the set of eMBMS services. ID component 1435 may determine an indication for receiving the broadcast or multicast data based on a temporary mobile group identity (TMGI) or a group ID. Paging component 1440 may monitor a paging occasion (PO) associated with a temporary mobile group identity (TMGI) or a group ID. The eMBMS timing component 1445 may receive a message that indicates timing associated with the eMBMS services available for subscription.

Figure 15:
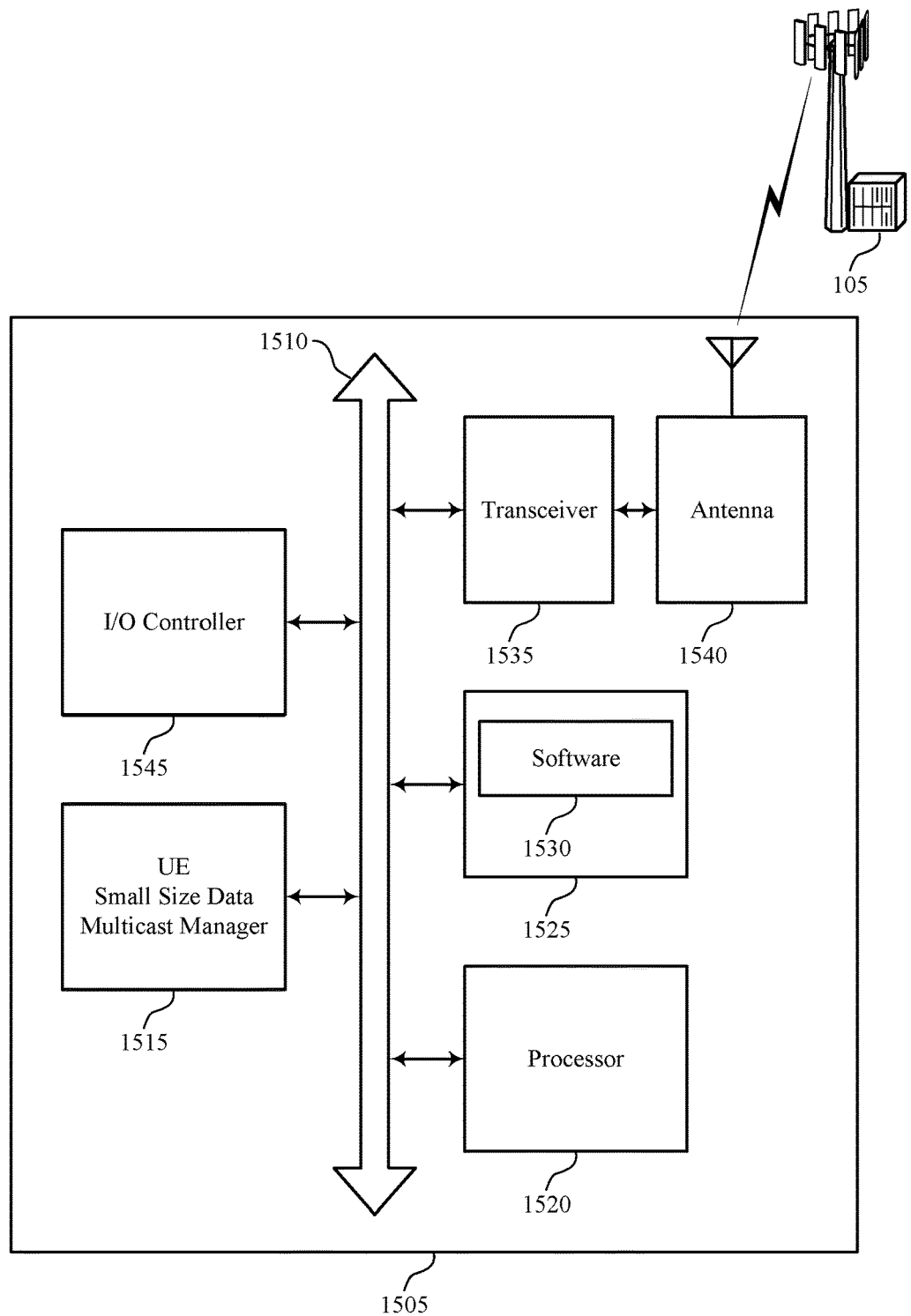
FIG. 15 illustrates a block diagram of a system, including a UE, that supports multicasting or broadcasting data in accordance with aspects of the present disclosure.

FIG. 15 shows a diagram of a system 1500 including a device 1505 that supports multicasting or broadcasting data in accordance with various aspects of the present disclosure. Device 1505 may be an example of or include the components of UE 115 as described above, e.g., with reference to FIG. 1. Device 1505 may include components for bi-directional voice and data communications including components for transmitting and receiving communications, including UE small size data multicast manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting small size data multicast in NB-IOT or eMTC).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support small size data multicast in NB-IOT or eMTC. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
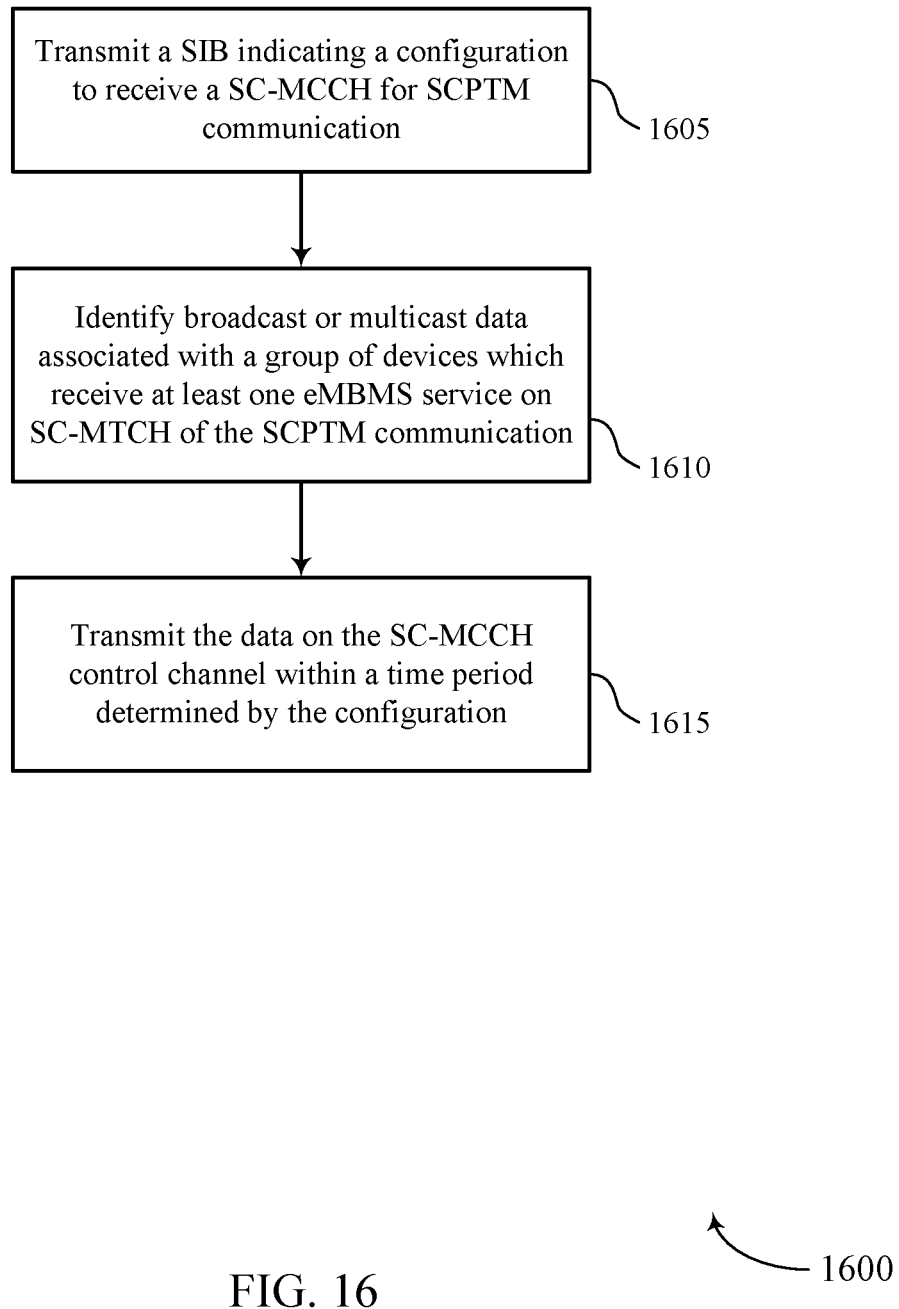
FIGS. 16 through 20 illustrate methods for small size data multicast or broadcast in accordance with aspects of the present disclosure.

FIG. 16 shows a flowchart illustrating a method 1600 for small size data multicast or broadcast in accordance with aspects of the present disclosure. The operations of method 1600 may be implemented by a base station 105 or its components as described herein. For example, the operations of method 1600 may be performed by a base station small size data multicast manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may transmit a system information block (SIB) indicating a configuration to receive a single-cell multicast control channel (SC-MCCH) for single cell point to multipoint (SCPTM) communication. The operations of block 1605 may be performed according to the methods described with reference to FIGS. 1 through 7. In certain examples, aspects of the operations of block 1605 may be performed by a SIB component as described with reference to FIGS. 8 through 11.

At block 1610 the base station 105 may identify broadcast or multicast data associated with a group of devices which receive at least one evolved multimedia broadcast multicast service (eMBMS) service on a single cell multicast traffic channel (SC-MTCH) of the SCPTM communication. The operations of block 1610 may be performed according to the methods described with reference to FIGS. 1 through 7. In certain examples, aspects of the operations of block 1610 may be performed by an eMBMS component as described with reference to FIGS. 8 through 11.

At block 1615 the base station 105 may transmit the data on the SC-MCCH control channel within a time period determined by the configuration. The operations of block 1615 may be performed according to the methods described with reference to FIGS. 1 through 7. In certain examples, aspects of the operations of block 1615 may be performed by a SCPTM component as described with reference to FIGS. 8 through 11.

Figure 17:
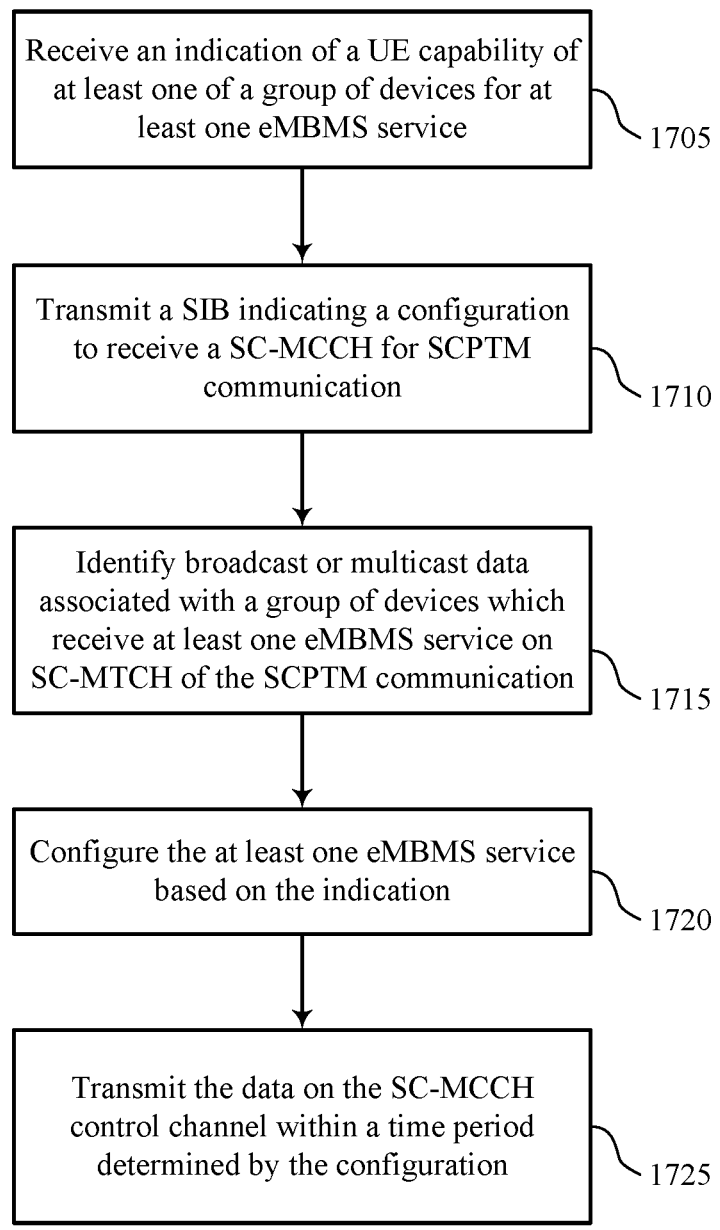

FIG. 17 shows a flowchart illustrating a method 1700 for small size data multicast or broadcast in accordance with aspects of the present disclosure. The operations of method 1700 may be implemented by a base station 105 or its components as described herein. For example, the operations of method 1700 may be performed by a base station small size data multicast manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may receive an indication of a user equipment (UE) capability of at least one of the group of devices for the at least one eMBMS service. The operations of block 1705 may be performed according to the methods described with reference to FIGS. 1 through 7. In certain examples, aspects of the operations of block 1705 may be performed by a UE capability component as described with reference to FIGS. 8 through 11.

At block 1710 the base station 105 may transmit a system information block (SIB) indicating a configuration to receive a single-cell multicast control channel (SC-MCCH) for single cell point to multipoint (SCPTM) communication. The operations of block 1710 may be performed according to the methods described with reference to FIGS. 1 through 7. In certain examples, aspects of the operations of block 1710 may be performed by a SIB component as described with reference to FIGS. 8 through 11.

At block 1715 the base station 105 may identify broadcast or multicast data associated with a group of devices which receive at least one evolved multimedia broadcast multicast service (eMBMS) service on a single cell multicast traffic channel (SC-MTCH) of the SCPTM communication. The operations of block 1715 may be performed according to the methods described with reference to FIGS. 1 through 7. In certain examples, aspects of the operations of block 1715 may be performed by an eMBMS component as described with reference to FIGS. 8 through 11.

At block 1720 the base station 105 may configure the at least one eMBMS service based on the indication. The operations of block 1720 may be performed according to the methods described with reference to FIGS. 1 through 7. In certain examples, aspects of the operations of block 1720 may be performed by an eMBMS component as described with reference to FIGS. 8 through 11.

At block 1725 the base station 105 may transmit the data on the SC-MCCH control channel within a time period determined by the configuration. The operations of block 1725 may be performed according to the methods described with reference to FIGS. 1 through 7. In certain examples, aspects of the operations of block 1725 may be performed by a SCPTM component as described with reference to FIGS. 8 through 11.

Figure 18:
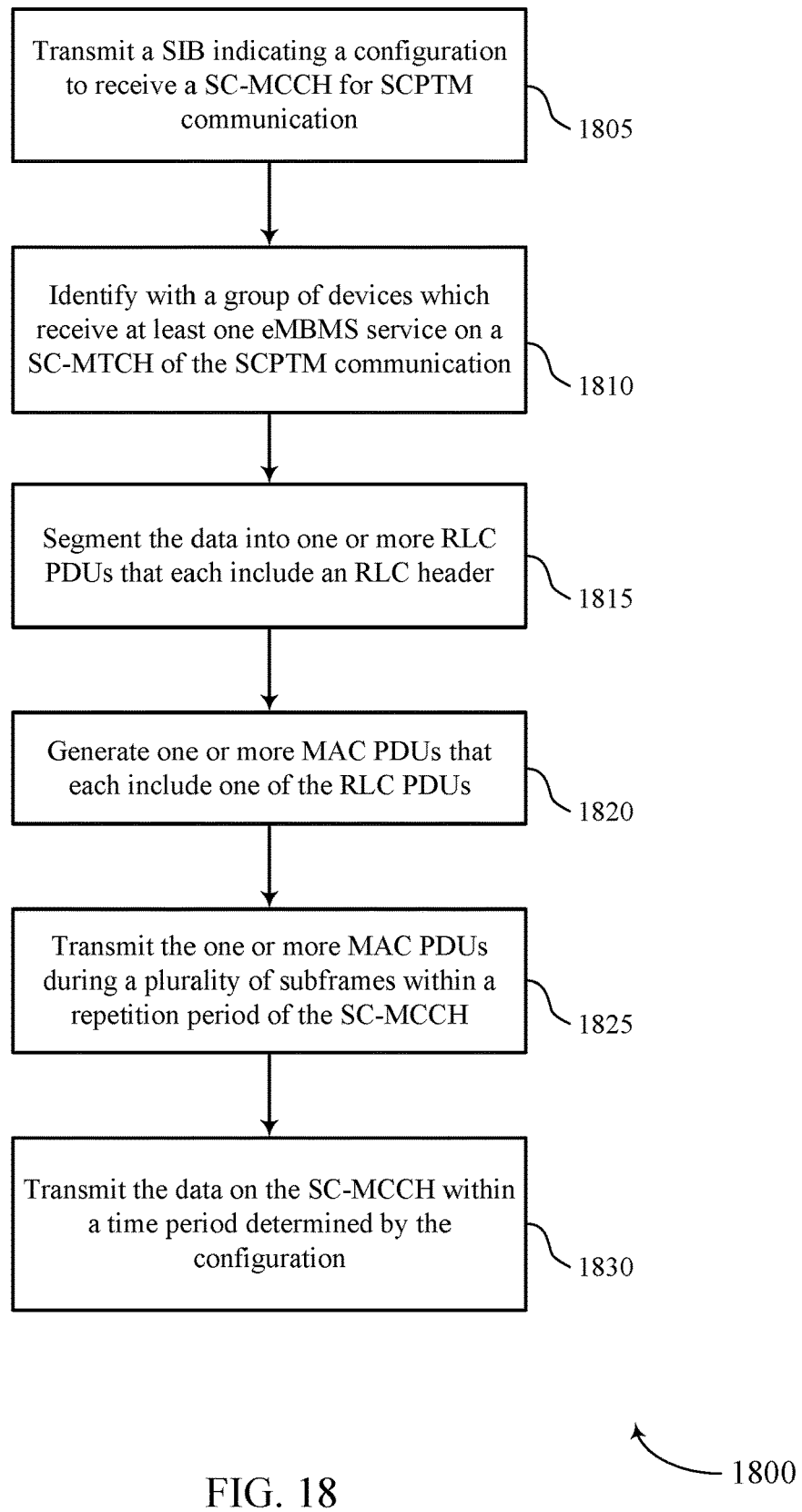

FIG. 18 shows a flowchart illustrating a method 1800 for small size data multicast or broadcast in accordance with aspects of the present disclosure. The operations of method 1800 may be implemented by a base station 105 or its components as described herein. For example, the operations of method 1800 may be performed by a base station small size data multicast manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may transmit a system information block (SIB) indicating a configuration to receive a single-cell multicast control channel (SC-MCCH) for single cell point to multipoint (SCPTM) communication. The operations of block 1805 may be performed according to the methods described with reference to FIGS. 1 through 7. In certain examples, aspects of the operations of block 1805 may be performed by a SIB component as described with reference to FIGS. 8 through 11.

At block 1810 the base station 105 may identify broadcast or multicast data associated with a group of devices which receive at least one evolved multimedia broadcast multicast service (eMBMS) service on a single cell multicast traffic channel (SC-MTCH) of the SCPTM communication. The operations of block 1810 may be performed according to the methods described with reference to FIGS. 1 through 7. In certain examples, aspects of the operations of block 1810 may be performed by an eMBMS component as described with reference to FIGS. 8 through 11.

At block 1815 the base station 105 may segment the data into one or more radio link control (RLC) protocol data units (PDUs) that each comprise an RLC header. The operations of block 1815 may be performed according to the methods described with reference to FIGS. 1 through 7. In certain examples, aspects of the operations of block 1815 may be performed by a segmenting component as described with reference to FIGS. 8 through 11.

At block 1820 the base station 105 may generate one or more medium access control (MAC) PDUs that each comprise one of the RLC PDUs. The operations of block 1820 may be performed according to the methods described with reference to FIGS. 1 through 7. In certain examples, aspects of the operations of block 1820 may be performed by a MAC entity as described with reference to FIGS. 8 through 11.

At block 1825 the base station 105 may transmit the one or more MAC PDUs during a plurality of subframes within a repetition of the multicast control channel. The operations of block 1825 may be performed according to the methods described with reference to FIGS. 1 through 7. In certain examples, aspects of the operations of block 1825 may be performed by a transmitter as described with reference to FIGS. 8 through 11.

At block 1830 the base station 105 may transmit the data on the SC-MCCH within a time period determined by the configuration. The operations of block 1830 may be performed according to the methods described with reference to FIGS. 1 through 7. In certain examples, aspects of the operations of block 1830 may be performed by a SCPTM component as described with reference to FIGS. 8 through 11.

Figure 19:
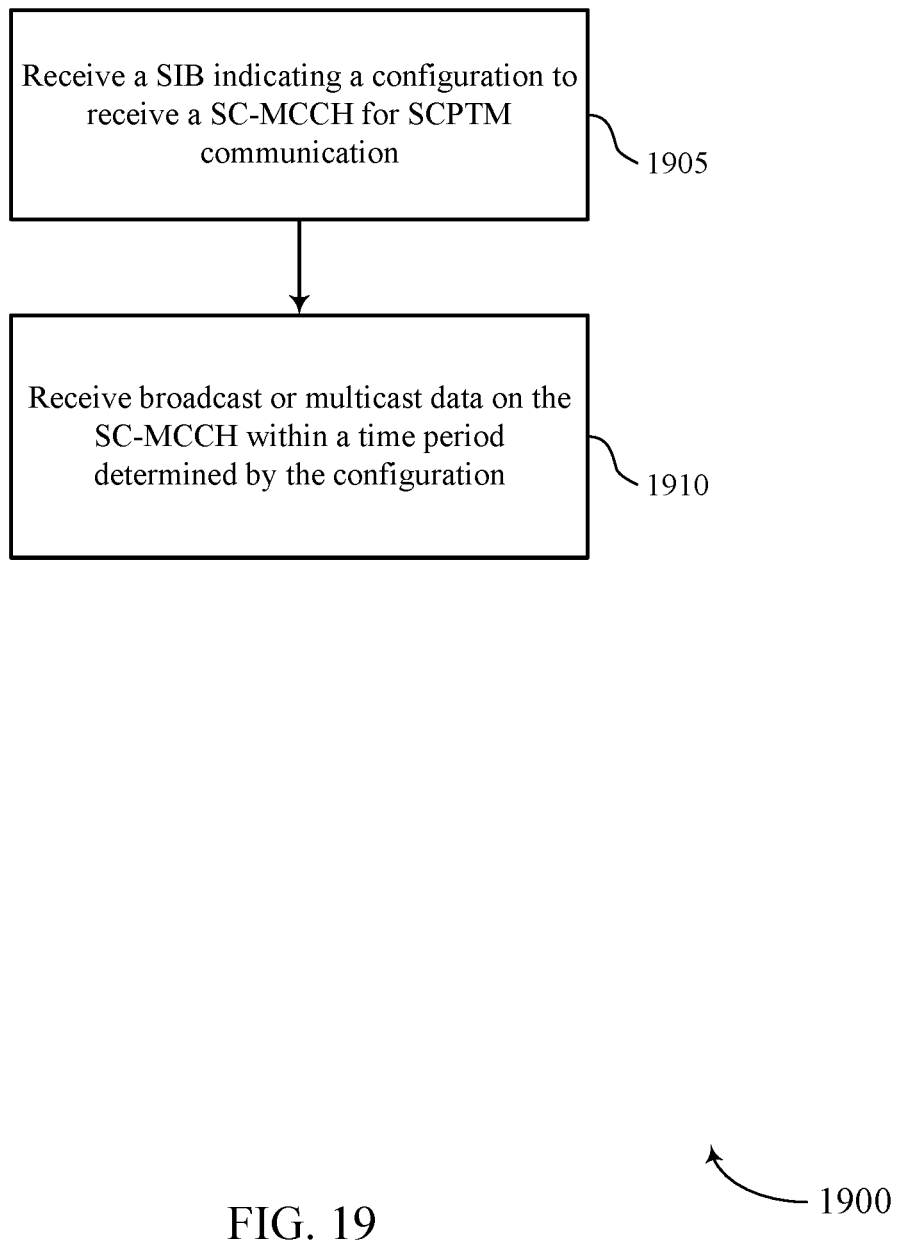

FIG. 19 shows a flowchart illustrating a method 1900 for small size data multicast or broadcast in accordance with aspects of the present disclosure. The operations of method 1900 may be implemented by a UE 115 or its components as described herein. For example, the operations of method 1900 may be performed by a UE small size data multicast manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive a system information block (SIB) indicating a configuration to receive a single-cell multicast control channel (SC-MCCH) for single cell point to multipoint (SCPTM) communication. The operations of block 1905 may be performed according to the methods described with reference to FIGS. 1 through 7. In certain examples, aspects of the operations of block 1905 may be performed by a SIB component as described with reference to FIGS. 12 through 15.

At block 1910 the UE 115 may receive broadcast or multicast data on the SC-MCCH within a time period determined by the configuration. The operations of block 1910 may be performed according to the methods described with reference to FIGS. 1 through 7. In certain examples, aspects of the operations of block 1910 may be performed by a SCPTM component as described with reference to FIGS. 12 through 15.

Figure 20:
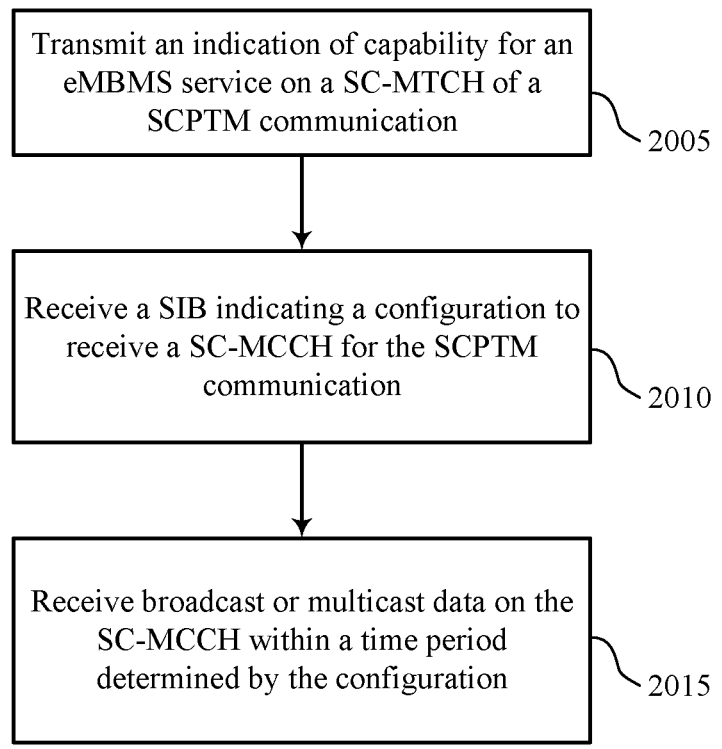

FIG. 20 shows a flowchart illustrating a method 2000 for small size data multicast or broadcast in accordance with aspects of the present disclosure. The operations of method 2000 may be implemented by a UE 115 or its components as described herein. For example, the operations of method 2000 may be performed by a UE small size data multicast manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may transmit an indication of capability for an evolved multimedia broadcast multicast service (eMBMS) service on a single cell multicast traffic channel (SC-MTCH) of the SCPTM communication. The operations of block 2005 may be performed according to the methods described with reference to FIGS. 1 through 7. In certain examples, aspects of the operations of block 2005 may be performed by a UE capability component as described with reference to FIGS. 12 through 15.

At block 2010 the UE 115 may receive a system information block (SIB) indicating a configuration to receive a single-cell multicast control channel (SC-MCCH) for single cell point to multipoint (SCPTM) communication. The operations of block 2010 may be performed according to the methods described with reference to FIGS. 1 through 7. In certain examples, aspects of the operations of block 2010 may be performed by a SIB component as described with reference to FIGS. 12 through 15.

At block 2015 the UE 115 may receive broadcast or multicast data on the SC-MCCH within a time period determined by the configuration. The operations of block 2015 may be performed according to the methods described with reference to FIGS. 1 through 7. In certain examples, aspects of the operations of block 2015 may be performed by a SCPTM component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a system information block (SIB) indicating a configuration to receive a single-cell multicast control channel (SC-MCCH) for single cell point to multipoint (SCPTM) communication;
    transmitting control information on the SC-MCCH;
    identifying broadcast or multicast data associated with a group of devices which receive at least one evolved multimedia broadcast multicast service (eMBMS) service on a single cell multicast traffic channel (SC-MTCH) of the SCPTM communication; and
    transmitting the broadcast or multicast data on the SC-MCCH within a time period determined by the configuration.

2. The method of claim 1, wherein the data is transmitted in a first message and SCPTM configuration data is transmitted in a second message different from the first message on the SC-MCCH.

3. The method of claim 1, wherein the data is multiplexed with SCPTM configuration data on the SC-MCCH.

4. The method of claim 3, wherein multiplexing the data is performed at a radio link control (RLC) layer of a wireless communication protocol.

5. The method of claim 1, further comprising:
    determining that a size of the data is less than a threshold size, wherein transmitting the data on the SC-MCCH within the time period is based at least in part on determining the size of the data.

6. The method of claim 1, further comprising:
    receiving an indication of a user equipment (UE) capability of at least one of the group of devices for the at least one eMBMS service; and
    configuring the at least one eMBMS service based at least in part on the indication.

7. The method of claim 1, wherein transmitting the data comprises:
    multiplexing the data with the SC-MCCH control information at a radio link control (RLC) protocol entity.

8. The method of claim 1, wherein transmitting the data comprises:
    transmitting the data during a plurality of SC-MCCH modification periods that each comprise a plurality of repetitions of the SC-MCCH.

9. The method of claim 1, wherein identifying the broadcast or the multicast data comprises:
    identifying the data during a first SC-MCCH modification period; and
    wherein transmitting the broadcast or multicast data comprises transmitting the data during the first SC-MCCH modification period.

10. The method of claim 3, further comprising:
    transmitting a plurality of grants for the SC-MCCH on a downlink control channel, wherein transmitting the data on the SC-MCCH comprises transmitting a plurality of MAC packets within the time period.

11. The method of claim 1, wherein the data further comprises an identifier associated with the group of devices, wherein the identifier comprises at least one of a temporary mobile group identity (TMGI), or a service ID, or a group ID, or a destination internet protocol (IP) address and UDP port, or a combination thereof.

12. The method of claim 1, further comprising:
    transmitting a message that indicates timing associated with the at least one eMBMS service.

13. The method of claim 12, wherein the message that indicates the timing comprises user service description (USD) or direction indication information (DII), or both.

14. The method of claim 13, wherein the DII is transmitted during a paging occasion (PO) that is associated with the at least one eMBMS service.

15. A method for wireless communication, comprising:
    receiving a system information block (SIB) indicating a configuration to receive a single-cell multicast control channel (SC-MCCH) for single cell point to multipoint (SCPTM) communication;
    receiving control information on the SC-MCCH; and
    receiving broadcast or multicast data on the SC-MCCH within a time period determined by the configuration.

16. The method of claim 15, wherein the broadcast or the multicast data is received in a first message and SCPTM configuration data is received in a second message different from the first message.

17. The method of claim 15, further comprising:
    transmitting an indication of capability for an evolved multimedia broadcast multicast service (eMBMS) service on a single cell multicast traffic channel (SC-MTCH) of the SCPTM communication.

18. The method of claim 17, further comprising:
    receiving the broadcast or the multicast data during a first SC-MCCH modification period based at least in part on a user service description (USD), wherein the eMBMS service comprises the USD.

19. The method of claim 17, wherein the eMBMS service comprises direction indication information (DII).

20. The method of claim 19, further comprising:
    monitoring a paging occasion (PO) associated with a temporary mobile group identity (TMGI) or a group ID; and
    receiving the DII or the eMBMS service during the PO.

21. The method of claim 15, further comprising:
    determining an indication for receiving the broadcast or the multicast data based at least in part on a temporary mobile group identity (TMGI) or a group ID.

22. A network device for wireless communication, in a system comprising:
    a processor;
    memory in electronic communication with the processor; and
    instructions stored in the memory and operable, when executed by the processor, to cause the network device to:
        transmit transmitting a system information block (SIB) indicating a configuration to receive a single-cell multicast control channel (SC-MCCH) for single cell point to multipoint (SCPTM) communication;
        transmit control information on the SC-MCCH;
        identify broadcast or multicast data associated with a group of devices which receive at least one evolved multimedia broadcast multicast service (eMBMS)

service on a single cell multicast traffic channel (SC-MTCH) of the SCPTM communication; and transmit the broadcast or multicast data on the SC-MCCH within a time period determined by the configuration.

23. The network device of claim 22, wherein the data is transmitted in a first message and SCPTM configuration data is transmitted in a second message different from the first message on the SC-MCCH.

24. The network device of claim 22, wherein the instructions are further executable by the processor to:
determine that a size of the data is less than a threshold size, wherein transmitting the data on the SC-MCCH within the time period is based at least in part on determining the size of the data.

25. The network device of claim 22, wherein the instructions are further executable by the processor to:
multiplex the data with the SC-MCCH control information at a radio link control (RLC) protocol entity.

26. The network device of claim 22, wherein the data further comprises an identifier associated with the group of devices, wherein the identifier comprises at least one of a temporary mobile group identity (TMGI), or a service ID, or a group ID, or a destination internet protocol (IP) address and UDP port, or a combination thereof.

27. A mobile device for wireless communication, in a system comprising:
a processor;
memory in electronic communication with the processor; and
instructions stored in the memory and operable, when executed by the processor, to cause the mobile device to:
receive a system information block (SIB) indicating a configuration to receive a single-cell multicast control channel (SC-MCCH) for single cell point to multipoint (SCPTM) communication;
receive control information on the SC-MCCH; and
receive broadcast or multicast data on the SC-MCCH within a time period determined by the configuration.

28. The mobile device of claim 27, wherein the instructions are further executable by the processor to:
transmit an indication of capability for an evolved multimedia broadcast multicast service (eMBMS) service on a single cell multicast traffic channel (SC-MTCH) of the SCPTM communication.

29. The mobile device of claim 27, wherein the instructions are further executable by the processor to:
receive the broadcast or the multicast data during a first SC-MCCH modification period based at least in part on a user service description (USD), wherein the eMBMS service comprises the USD.

30. The mobile device of claim 27, wherein the data further comprises an identifier associated with the group of devices, wherein the identifier comprises at least one of a temporary mobile group identity (TMGI), or a service ID, or a group ID, or a destination internet protocol (IP) address and UDP port, or a combination thereof.

* * * * *